United States Patent
Tamura et al.

(10) Patent No.: US 10,465,303 B2
(45) Date of Patent: Nov. 5, 2019

(54) PRODUCING SYSTEM OF REDUCTION PRODUCT

(71) Applicant: Kabushiki Kaisha Toshiba, Minato-ku (JP)

(72) Inventors: Jun Tamura, Tokyo (JP); Satoshi Mikoshiba, Yamato (JP); Yuki Kudo, Yokohama (JP); Akihiko Ono, Tokyo (JP); Ryota Kitagawa, Tokyo (JP); Masakazu Yamagiwa, Yokohama (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 278 days.

(21) Appl. No.: 15/261,030

(22) Filed: Sep. 9, 2016

(65) Prior Publication Data

US 2017/0073827 A1    Mar. 16, 2017

(30) Foreign Application Priority Data

Sep. 15, 2015  (JP) .................................. 2015-181404
Mar. 11, 2016  (JP) .................................. 2016-048902

(51) Int. Cl.
*C25B 15/08* (2006.01)
*C25B 1/04* (2006.01)
(Continued)

(52) U.S. Cl.
CPC .............. *C25B 15/08* (2013.01); *B01D 3/009* (2013.01); *B01D 3/143* (2013.01);
(Continued)

(58) Field of Classification Search
CPC .... C25B 1/04; C25B 3/04; C25B 9/06; C25B 15/08; B01D 3/009; B01D 3/143; B01D 11/0488; B01D 11/0492
See application file for complete search history.

(56) References Cited

U.S. PATENT DOCUMENTS 5,346,593 A * 9/1994 Cialkowski ............ B01D 3/146
                                                              202/154
2010/0209814 A1  8/2010 Suzuki et al.
(Continued)

FOREIGN PATENT DOCUMENTS

JP          4-2794 A     1/1992
JP    2010-188243 A     9/2010
(Continued)

OTHER PUBLICATIONS

Yu Sun, et al., "Photoelectrochemical Reduction of Carbon Dioxide at Si(111) Electrode Modified by Viologen Molecular Layer with Metal Complex" Chemistry Letters, vol. 41, No. 3, 2012, pp. 328-330.

(Continued)

*Primary Examiner* — Ciel P Thomas
(74) *Attorney, Agent, or Firm* — Oblon, McClelland, Maier & Neustadt, L.L.P.

(57) ABSTRACT

A producing system of reduction product of carbon dioxide includes a chemical reaction apparatus including an oxidation reaction electrolytic bath and a reduction reaction electrolytic bath, the chemical reaction apparatus configured to generate a reduction product by reducing carbon dioxide, an electrolytic solution supply unit supplying an electrolytic solution to the reduction reaction electrolytic bath, a carbon dioxide supply unit configured to dissolve carbon dioxide into the electrolytic solution, the carbon dioxide supply unit serving to sustain a reduction reaction in the reduction reaction electrolytic bath, and a separation unit configured to separate the reduction product from the electrolytic solution.

12 Claims, 13 Drawing Sheets

(51) Int. Cl.
*C25B 3/04* (2006.01)
*C25B 9/06* (2006.01)
*B01D 3/14* (2006.01)
*B01D 11/04* (2006.01)
*B01D 3/00* (2006.01)

(52) U.S. Cl.
CPC ...... *B01D 11/0488* (2013.01); *B01D 11/0492* (2013.01); *C25B 1/04* (2013.01); *C25B 3/04* (2013.01); *C25B 9/06* (2013.01)

(56) References Cited

U.S. PATENT DOCUMENTS

| | | | |
|---|---|---|---|
| 2010/0258446 A1* | 10/2010 | Mohapatra | C25B 1/003 205/340 |
| 2011/0071324 A1 | 3/2011 | Pitner et al. | |
| 2011/0114503 A1* | 5/2011 | Sivasankar | C25B 3/00 205/436 |
| 2012/0171583 A1* | 7/2012 | Bocarsly | H01M 4/8657 429/413 |
| 2012/0277465 A1* | 11/2012 | Cole | C25B 3/04 562/577 |
| 2013/0008800 A1* | 1/2013 | Lakkaraju | C25B 3/04 205/413 |
| 2013/0140187 A1 | 6/2013 | Teamey et al. | |
| 2015/0252482 A1 | 9/2015 | Ono et al. | |
| 2015/0252483 A1 | 9/2015 | Ono et al. | |
| 2016/0076158 A1 | 3/2016 | Tamura et al. | |

FOREIGN PATENT DOCUMENTS

| | | |
|---|---|---|
| JP | 2011-68699 A | 4/2011 |
| JP | 2011-94194 A | 5/2011 |
| JP | 2011-524342 A | 9/2011 |
| JP | 2014-74207 A | 4/2014 |
| JP | 2014-101550 A | 6/2014 |
| JP | 2014-101551 A | 6/2014 |
| JP | 2014-518335 A | 7/2014 |
| JP | 2015-54994 A | 3/2015 |
| JP | 2015-513616 A | 5/2015 |
| JP | 2015-132012 A | 7/2015 |
| JP | 2015-175020 A | 10/2015 |
| JP | 2015-534609 A | 12/2015 |
| WO | WO 2013/134418 A1 | 9/2013 |
| WO | WO 2014/054336 A1 | 4/2014 |
| WO | WO 2015/136776 A1 | 9/2015 |

OTHER PUBLICATIONS

Yi Zhang, et al., "$CO_2$ Capture by Imidazolate-Based Ionic Liquids: Effect of Functionalized Cation and Dication" Industrial & Engineering Chemistry Research, vol. 52, No. 18, 2013, pp. 6069-6075.

Andrew B. Bocarsly, et al., "Comparative Study of Imidazole and Pyridine Catalyzed Reduction of Carbon Dioxide at Illuminated Iron Pyrite Electrodes" American Chemical Society Catalysis, vol. 2, No. 8, 2012, pp. 1684-1692.

Brian A. Rosen, et al., "Ionic Liquid-Mediated Selective Conversion of $CO_2$ to Co at Low Overpotentials" Science, vol. 334, Issue 6056, 2011, pp. 643-644.

Yoshio Hori, et al, "Electrocatalytic Process of CO Selectivity in Electrochemical Reduction of $CO_2$ at Metal Electrodes in Aqueous Media" Electrochemica Acta, vol. 39, No. 11/12, 1994, pp. 1833-1839.

\* cited by examiner

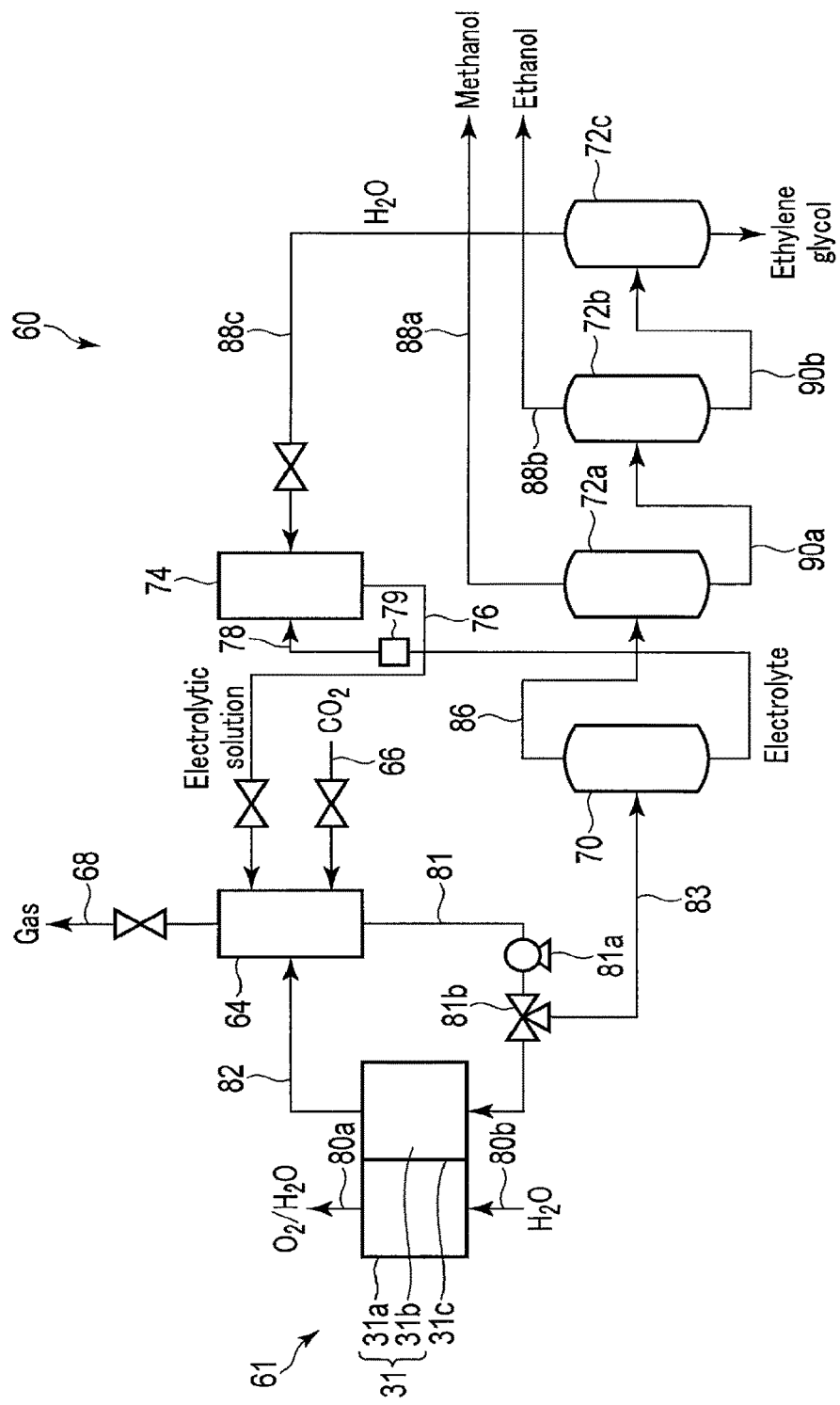
F I G. 2

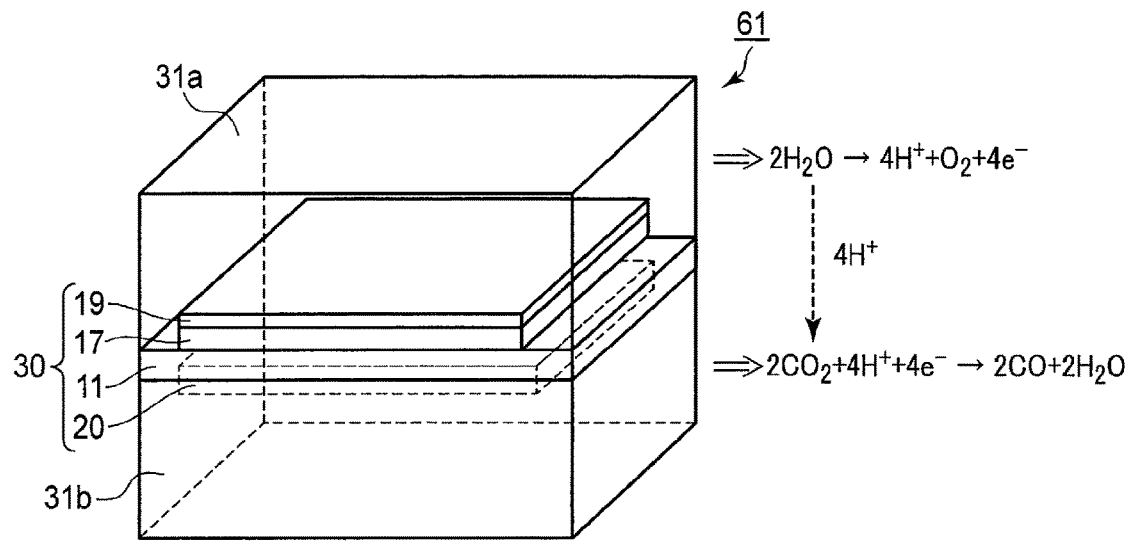
F I G. 8
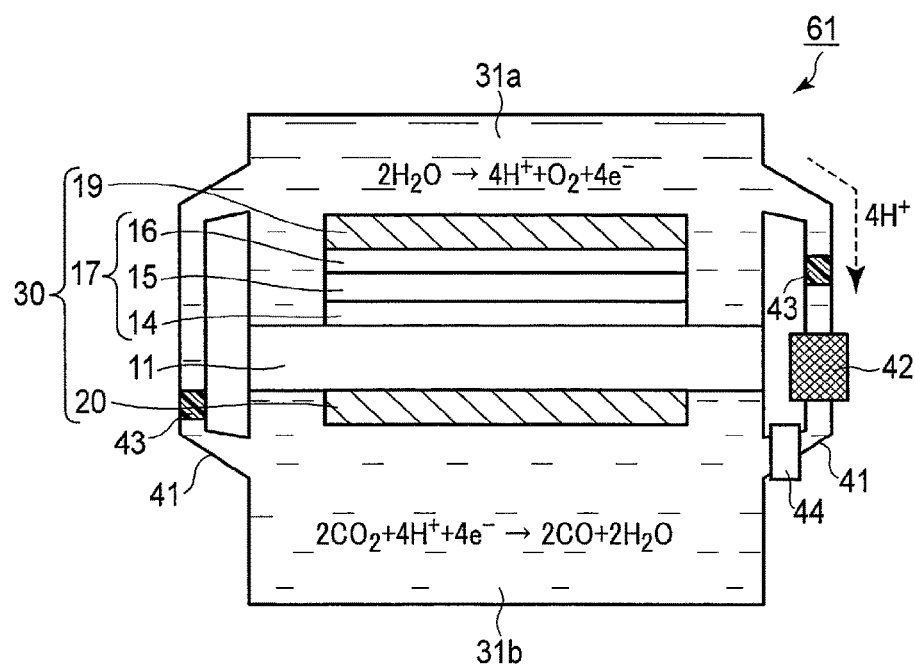
F I G. 9

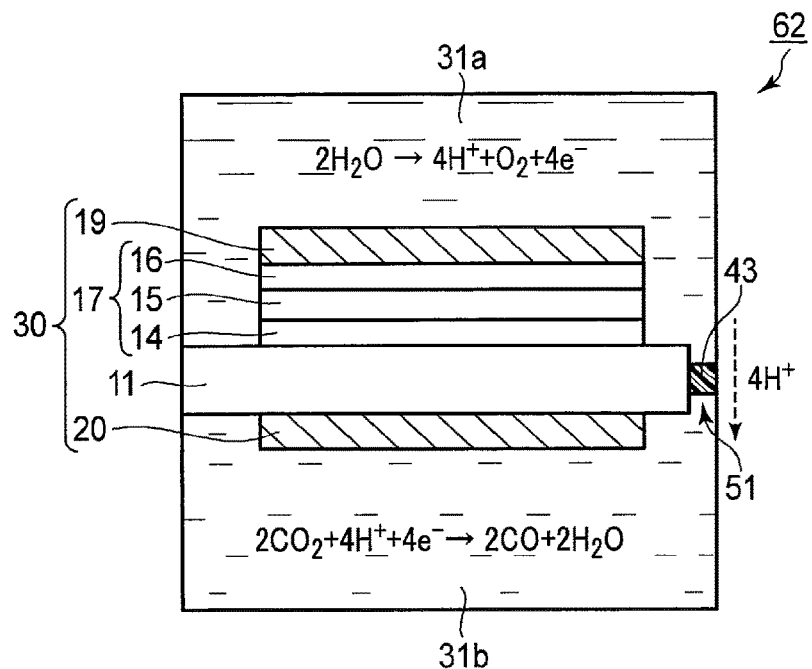
F I G. 10
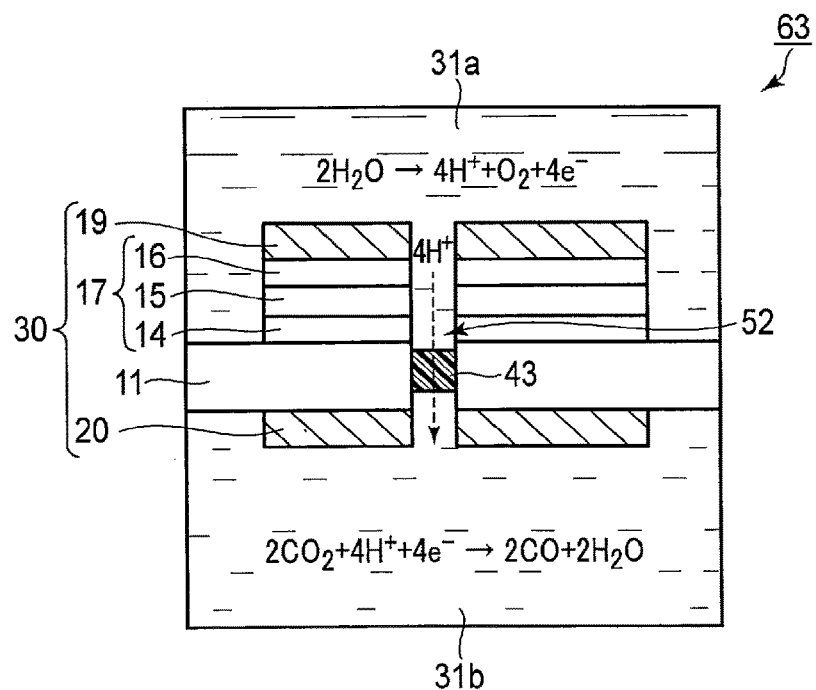
F I G. 11

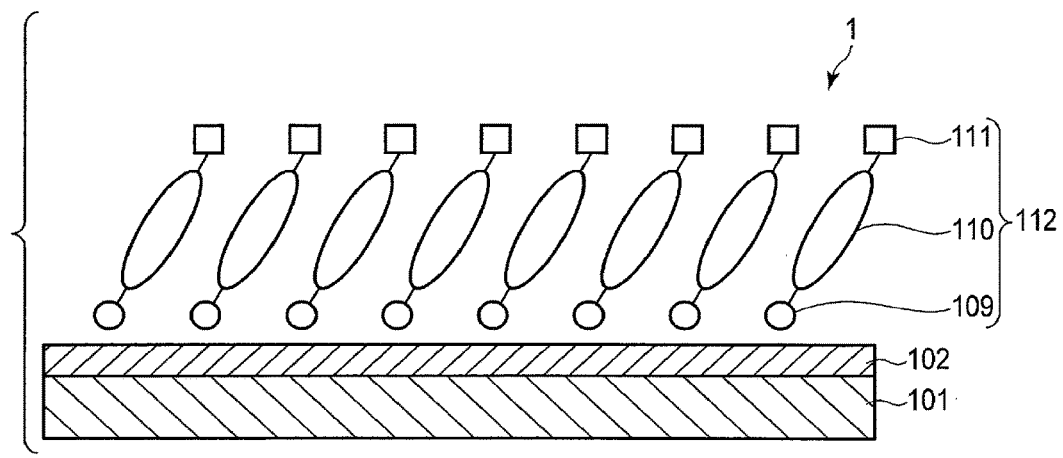
F I G. 12
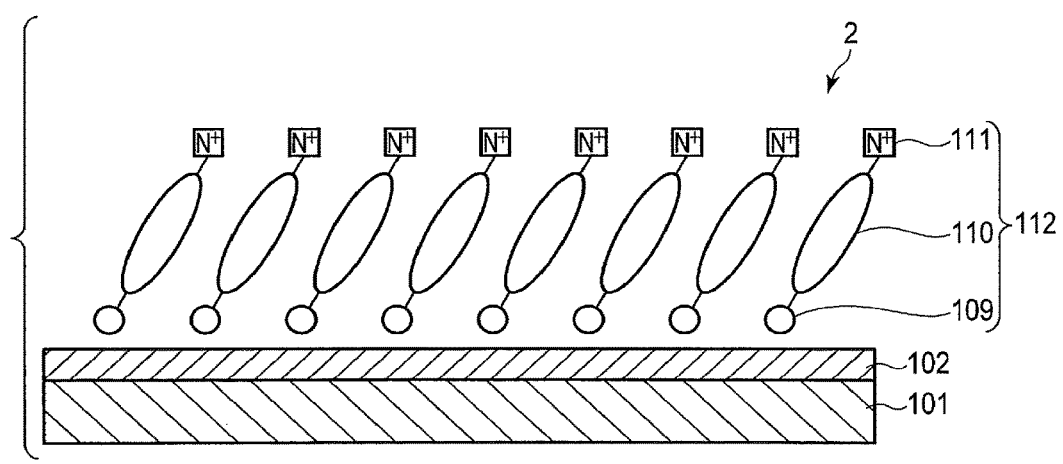
F I G. 13

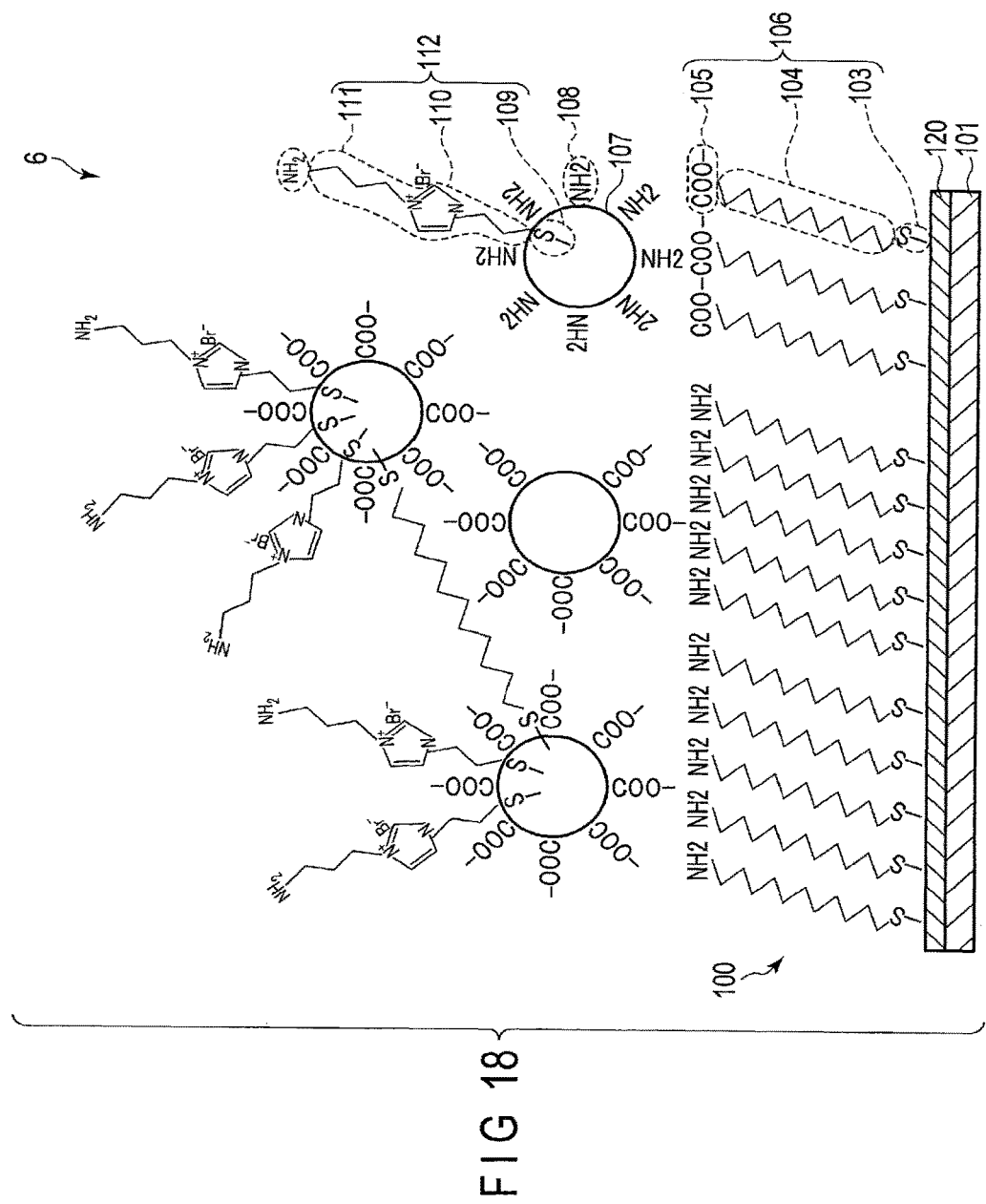

PRODUCING SYSTEM OF REDUCTION PRODUCT

CROSS-REFERENCE TO RELATED APPLICATIONS

This application is based upon and claims the benefit of priority from Japanese Patent Application Nos. 2015-181404, filed Sep. 15, 2015 and 2016-048902, filed Mar. 11, 2016; the entire contents of all of which are incorporated herein by reference.

FIELD

Embodiments described herein relate generally to a producing system of a reduction product of carbon dioxide.

BACKGROUND

From the viewpoints of energy problems and environmental problems, efficient $CO_2$ reduction utilizing light energy similar to that performed by plants is in demand. Plants use a system called "Z-scheme" in which the light energy is excited in two stages. In the photochemical reaction using the system, water ($H_2O$) is oxidized to give electrons, and carbon dioxide ($CO_2$) is reduced to cause synthesis of celluloses and sugars.

At present, artificial photosynthesis systems for obtaining potentials required for reduction of $CO_2$ in imitation of the z-scheme by plants are under development.

BRIEF DESCRIPTION OF THE DRAWINGS

FIG. 2 is a block diagram showing another example of a configuration of producing system of reduction product according to embodiments;

FIG. 8 is a perspective view showing a configuration of a chemical reaction apparatus installed in the producing system of reduction product according to an embodiment;

FIG. 9 is a cross-sectional view showing the chemical reaction apparatus shown in FIG. 8;

FIG. 10 is a cross-sectional view showing a configuration of Modification Example 1 of the chemical reaction apparatus shown in FIG. 8;

FIG. 11 is a cross-sectional view showing a configuration of Modification Example 2 of the chemical reaction apparatus shown in FIG. 8;

FIG. 12 is a schematic view showing a configuration of a first reduction catalyst;

FIG. 13 is a schematic view showing a configuration of a reduction catalyst according to a first aspect of the first reduction catalyst;

FIG. 18 is a schematic view showing one example of a configuration of a reduction catalyst according to Modification Example 2 of the second aspect.

DETAILED DESCRIPTION

Hereinafter, embodiments will be described with reference to the drawings.

According to one embodiment, there is provided a producing system of reduction product configured to produce a reduction product of carbon dioxide. The system includes: a chemical reaction apparatus including an oxidation reaction electrolytic bath provided with an oxidation catalyst and a reduction reaction electrolytic bath provided with a reduction catalyst, the chemical reaction apparatus configured to generate a reduction product by reducing carbon dioxide; an electrolytic solution supply unit supplying an electrolytic solution to the reduction reaction electrolytic bath; a carbon dioxide supply unit configured to dissolve carbon dioxide into the electrolytic solution, the carbon dioxide supply unit serving to sustain a reduction reaction in the reduction reaction electrolytic bath such that a concentration of the reduction product in the electrolytic solution is increased; and a separation unit configured to separate the reduction product from the electrolytic solution in which the concentration of the reduction product is increased.

Figure 1:
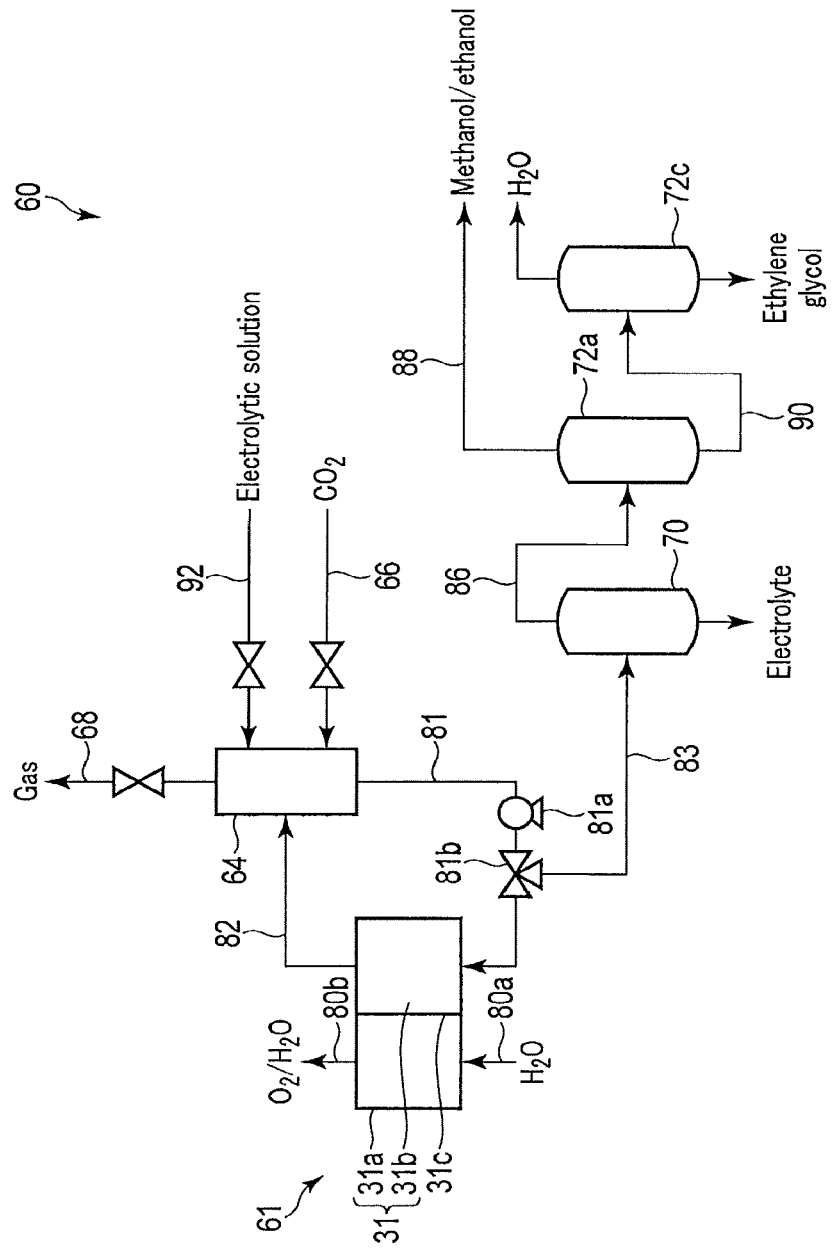
FIG. 1 is a block diagram showing one example of a configuration of a producing system of reduction product according to embodiments.

FIG. 1 shows one example of a configuration of a reduction product producing system 60. The reduction product producing system 60 comprises a chemical reaction apparatus 61 having an oxidation reaction electrolytic bath 31a, a reduction reaction electrolytic bath 31b, and a separator 31c, an electrolytic solution supply unit, a carbon dioxide supply unit, and a separation unit.

The chemical reaction apparatus 61 provided with an oxidation catalyst in the oxidation reaction electrolytic bath 31a and a reduction catalyst in the reduction reaction electrolytic bath 31b. Water is supplied to the oxidation reaction electrolytic bath 31a through the pipe 80a, and oxygen generated by an oxidation reaction is discharged through the pipe 80b together with water.

An electrolytic solution containing carbon dioxide is supplied from the electrolytic solution supply unit to the reduction reaction electrolytic bath 31b. In the reduction reaction electrolytic bath 31b, carbon dioxide in the electrolytic solution is reduced by the reduction catalyst, resulting in generation of reduction products. As the reduction catalyst, used is a catalyst not only capable of reducing carbon dioxide, but also capable of reducing intermediate products generated by the reduction of carbon dioxide such as formic acid, formaldehyde, oxalic acid, glycolic acid, and glycol aldehyde. The reduction catalyst and the chemical reaction apparatus will be described in detail later.

The electrolytic solution supply unit is a unit supplying the electrolytic solution to the reduction reaction electrolytic bath 31b and includes the storage tank 64 storing the electrolytic solution, the first pipe 81 serving to supply the electrolytic solution from the storage tank 64 to the reduction reaction electrolytic bath 31b, and the second pipe 82 serving to discharge the electrolytic solution from the reduction reaction electrolytic bath 31b and to return the electrolytic solution to the storage tank 64. The electrolytic solution supply unit is provided with the feed pump 81a and circulates the electrolytic solution between the storage tank 64 and the reduction reaction electrolytic bath 31b by the feed pump 81a. FIG. 1 shows an example in which the feed pump 81a is arranged on the first pipe 81, but is not limited thereto, and the feed pump 81a may be arranged on at least one of the first pipe 81 and the second pipe 82.

The electrolytic solution supply unit is connected to the separation unit, and the electrolytic solution circulating between the storage tank 64 and the reduction reaction electrolytic bath 31b is fed to the separation unit. For example, the three-way valve 81b is arranged on the first pipe 81, and the electrolytic solution is fed to the separation unit through the three-way valve 81b. The electrolytic solution circulating between the storage tank 64 and the reduction reaction electrolytic bath 31b is fed to the third pipe 83 of the separation unit through the three-way valve 81b when a predetermined time has passed. Alternatively, a part of the electrolytic solution circulating between the storage tank 64 and the reduction reaction electrolytic bath 31b is continuously fed to the third pipe 83 of the separation unit through the three-way valve 81b.

FIG. 1 shows the example in which the three-way valve 81b is arranged on the first pipe 81, but is not limited thereto, and the three-way valve 81b may be arranged on at least one of the first pipe 81 and the second pipe 82. Alternatively, a pipe having a valve may be arranged on the storage tank 64 instead of using the three-way valve 81b.

The pipe 92 having a valve is arranged on the storage tank 64, and a fresh electrolytic solution is supplied to the storage tank 64 through the pipe 92.

The carbon dioxide supply unit is a unit configured to supply carbon dioxide to the electrolytic solution supplied to the reduction reaction electrolytic bath 31b. The carbon dioxide supply unit is arranged on at least one of the reduction reaction electrolytic bath 31b, the storage tank 64, the first pipe 81, and the second pipe 82. The carbon dioxide supply unit may include the pipe 66 provided with a valve and a spray unit directly spraying a carbon gas into the electrolytic solution as shown in FIG. 1.

The electrolytic solution supply unit may preferably be provided with an exhaust unit exhausting oversupplied carbon dioxide gas not dissolved in the electrolytic solution and a gas generated by the reduction reaction. The exhaust unit may be the pipe 68 provided with a valve and, for example, may be arranged on the storage tank 64.

The separation unit is a unit configured to recover the $CO_2$ reduction products from the electrolytic solution. The separation unit is provided with the third pipe 83 connected to the electrolytic solution supply unit through the three-way valve 81b and a unit configured to separate an electrolyte and reduction products from the electrolytic solution. Specifically, the separation unit is provided with the crude distillation column 70 configured to separate the electrolyte from the electrolytic solution and the rectifying column 72 configured to separate the reduction products from a liquid component discharged from the crude distillation column 70.

In one aspect, as shown in FIG. 1, the rectifying column 72 is provided with the first rectifying column 72a configured to separate the reduction product having a lower boiling point than water and the third rectifying column 72c configured to separate the reduction product having a higher boiling point than water. Examples of the reduction product having lower boiling point than water include, but not limited thereto, methanol and ethanol. Examples of the reduction product having lower boiling point than water include, but not limited thereto, ethylene glycol.

In the separation unit, the electrolytic solution fed to the third pipe 83 from the electrolytic solution supply unit through the three-way valve 81b is firstly supplied to the crude distillation column 70. In the crude distillation column 70, the electrolytic solution is distilled to be separated into the liquid component and the electrolyte. The distillation in the crude distillation column 70 may be performed by a conventional method. Specifically, the electrolytic solution is subjected to distillation under a reduced pressure of 10 to 120 Torr. Thus, 85 to 99 mass % of the reduction products and liquid components such as water contained in the electrolytic solution are evaporated and discharged from the column top. On the other hand, the electrolyte is accumulated in the column bottom to be removed to the outside of the column.

The liquid component discharged from the column top of the crude distillation column 70 is supplied to the first rectifying column 72a through the pipe 86 to be rectified. The rectification in the first rectifying column 72a may be performed by a conventional method. Specifically, the rectification may be performed by distillation under reduced pressure utilizing a difference in boiling points. Thus, the liquid component containing the reduction products having the boiling point lower than water, such as methanol and ethanol, is discharged from the column top of the first rectifying column 72a through the pipe 88. On the other hand, the liquid component containing the reduction products having the boiling point higher than water is discharged from the column bottom.

The liquid component containing the reduction products having the boiling point lower than water, such as methanol and ethanol, discharged from the column top of the first rectifying column 72a may be further purified into the respective components or may be used for preparing a renewed electrolytic solution as described later.

The liquid component discharged from the column bottom of the first rectifying column 72a is subsequently supplied to the third rectifying column 72c through the pipe 90 to be rectified. The rectification in the third rectifying column 72c may be performed by a conventional method. Specifically, the rectification may be performed by distillation under reduced pressure utilizing a difference in boiling points, whereby water is separated from the column top, and the liquid component containing the reduction products having the boiling point higher than water is discharged from the column bottom. Examples of the reduction product include ethylene glycol.

The electrolytic solution used in the reduction product producing system 60 according to the embodiment may preferably have properties of lowering a reduction potential of $CO_2$, of having high ion conductivity, and of absorbing $CO_2$. Examples of the electrolyte contained in the electrolytic solution include lithium hydroxide, sodium hydroxide, potassium hydroxide, lithium carbonate, sodium carbonate, potassium carbonate, lithium hydrogen carbonate, sodium hydrogen carbonate, potassium hydrogen carbonate, lithium chloride, sodium chloride, potassium chloride, lithium sulfate, lithium bromide, sodium bromide, potassium bromide, lithium iodide, sodium iodide, potassium iodide, sodium sulfate, potassium sulfate, lithium hydrogen sulfate, sodium hydrogen sulfate, potassium hydrogen sulfate, lithium phosphate, sodium phosphate, potassium phosphate, lithium hydrogen phosphate, sodium hydrogen phosphate, potassium hydrogen phosphate, lithium dihydrogen phosphate, sodium dihydrogen phosphate, and potassium dihydrogen phosphate. As a solvent, water may preferably be used. A concentration of the electrolyte in the electrolytic solution may appropriately be determined in view of solubility of $CO_2$, ion conductivity, and viscosity. For example, the concentration may preferably be within the range of 0.01 to 1 mol/L.

In the reduction product producing system 60 according to the embodiment, it is possible to efficiently recover the reduction products by separating the electrolyte from the electrolytic solution with the use of the electrolytic solution containing the above-described electrolyte.

In one aspect, the reduction product producing system 60 may be provided with a plurality of chemical reaction apparatuses 61. The plurality of chemical reaction apparatuses 61 may be connected in series or connected in parallel. By providing the plurality of chemical reaction apparatuses 61, it is possible to improve the reduction efficiency.

In one aspect, as shown in FIG. 2, the reduction product producing system 60 is provided with the first rectifying column 72a configured to separate methanol, the second rectifying column 72b configured to separate ethanol, and the third rectifying column 72c configured to separate ethylene glycol. The liquid component discharged from the crude distillation column 70 is supplied to the first rectifying column 72a through the pipe 86 to be rectified. The rectification in the first rectifying column 72a may be performed by a conventional method. Specifically, the rectification may be performed by distillation under reduced pressure utilizing a difference in boiling points. Thus, methanol is discharged from the column top of the first rectifying column 72a through the pipe 88a, and the rest of the liquid component is discharged from the column bottom.

The liquid component discharged from the column bottom of the first rectifying column 72a is then supplied to the second rectifying column 72b through the pipe 90a to be rectified. The rectification in the second rectifying column 72b may be performed by a conventional method. Specifically, the rectification may be performed by distillation under reduced pressure utilizing a difference in boiling points. Thus, ethanol is discharged from the column top through the pipe 88b, and the rest of the liquid component is discharged from the column bottom.

The liquid component discharged from the column bottom of the second rectifying column 72b is then supplied to the third rectifying column 72c through the pipe 90b to be rectified. The rectification in the third rectifying column 72c may be performed by a conventional method. Specifically, the rectification may be performed by distillation under reduced pressure utilizing a difference in boiling points. Thus, water is discharged from the column top through the pipe 88c, and ethylene glycol is discharged from the column bottom.

According to the above-described configuration, it is possible to recover each of methanol, ethanol, and ethylene glycol.

In another aspect, as shown in FIG. 2, the reduction product producing system 60 may be provided with the preparation tank 74 serving to prepare a renewed electrolytic solution by using the electrolyte separated by the crude distillation column 70 and water separated by the rectifying column 72.

The electrolyte separated by the crude distillation column 70 is charged into the preparation tank 74 through the fifth pipe 78. The fifth pipe 78 may have a reception tank 79 serving to temporarily store the electrolyte. Also, water discharged from the column top of the third rectifying column 72c is supplied to the preparation tank 74 through the pipe 88c.

In the preparation tank 74, the renewed electrolytic solution is prepared by using the electrolyte and water. A stirring mechanism such as a stirring blade may preferably be arranged in the preparation tank 74. The electrolytic solution may be subjected to concentration adjustment using a known method such that the electrolytic solution has a predetermined concentration. For example, a homogenous solution is prepared by mixing the electrolyte and water in predetermined masses and dissolving the electrolyte by stirring with the stirring mechanism.

The preparation tank 74 may be provided with a pH meter or an electroconductivity meter measuring a hydrogen ion concentration or electroconductivity. With the use of these appliances, it is possible to identify that the electrolyte is dissolved into water and that the electrolytic solution having predetermined concentration is prepared.

The electrolytic solution prepared in the preparation tank 74 is supplied to the storage tank 64 through the fourth pipe 76 having a valve.

According to the above-described configuration, it is possible to conveniently maintain operation of the reduction product producing system since it is possible to use the electrolytic solution stably and continuously. Also, it is possible to reduce the cost since the separated electrolyte and water are reused.

In another aspect, the separation unit configured to recover the reduction products from the electrolytic solution in which the concentration of $CO_2$ reduction products is increased has another configuration in the reduction product producing system 60. The separation unit having another configuration is described below using FIG. 3.

Figure 3:
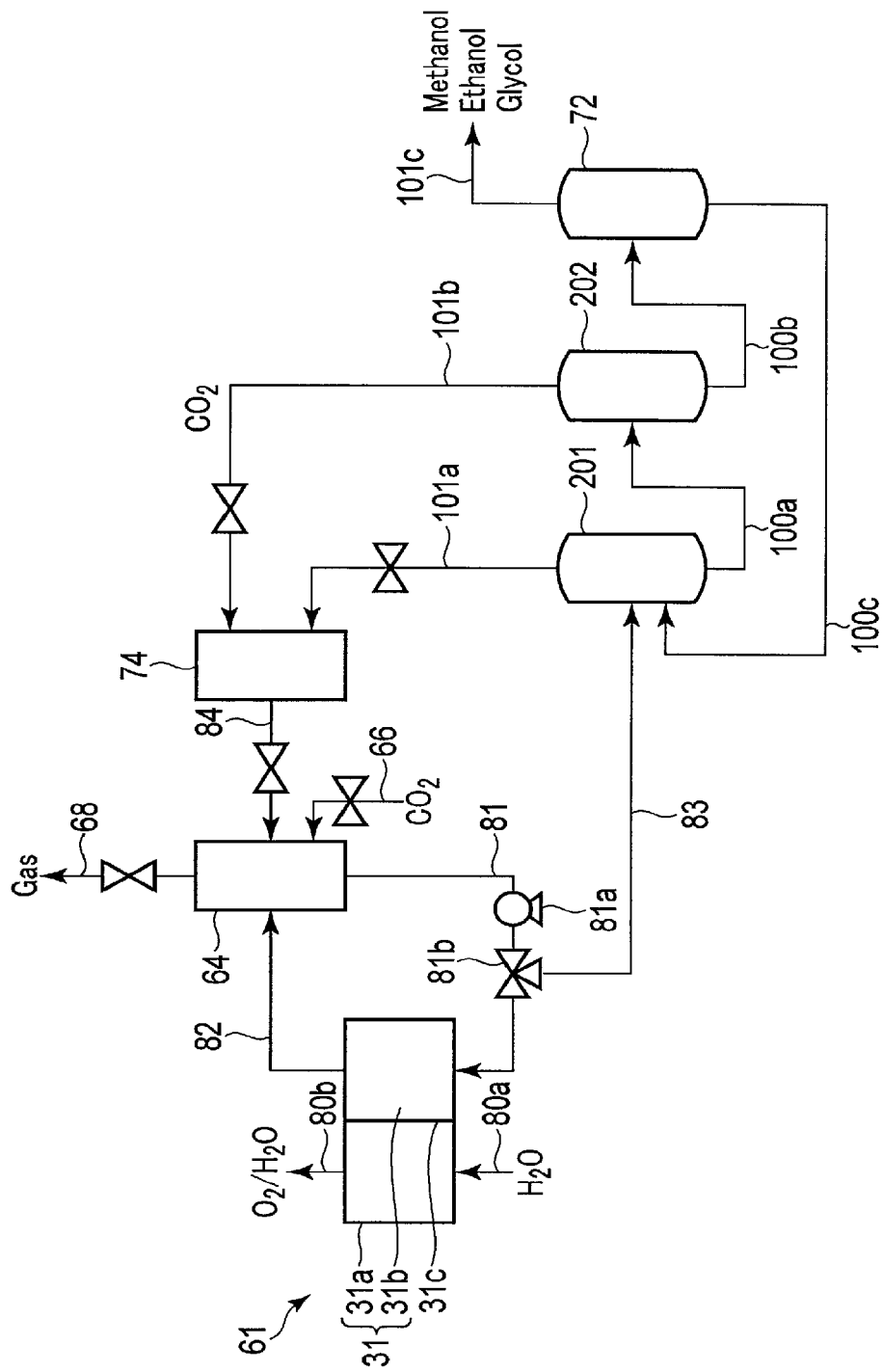
FIG. 3 is a block diagram showing another example of a configuration of producing system of reduction product according to embodiments.

In the reduction product producing system 60 shown in FIG. 3, the separation unit is connected to the electrolytic solution supply unit by the third pipe 83 through the three-way valve 81b.

The separation unit is provided with: the extractor 201 configured to extract the reduction products and unreacted carbon dioxide from the electrolytic solution having increased concentration of $CO_2$ reduction products into an ionic liquid as an extraction solvent; the carbon dioxide separation column 202 configured to separate $CO_2$ from the ionic liquid containing the reduction products and $CO_2$ discharged from the extractor 201; and the rectifying column 72 configured to separate the reduction products from the ionic liquid containing the reduction products discharged from the carbon dioxide separation column 202.

In the separation unit, the electrolytic solution fed to the third pipe 83 through the three-way valve 81b from the electrolytic solution supply unit is firstly supplied to the extractor 201. The extractor 201 is filled with the ionic liquid as the extraction solvent. In the extractor 201, liquid-liquid extraction is performed by mixing the electrolytic solution containing the reduction products and unreacted $CO_2$ with the ionic liquid as the extraction solvent and bringing them into contact with each other, by which the reduction products and unreacted $CO_2$ are extracted into the ionic liquid from the electrolytic solution.

The operation of the liquid-liquid extraction by mixing the electrolytic solution containing the reduction products and unreacted $CO_2$ with the ionic liquid and bringing them into contact with each other may be performed by a conventional method. Specifically, the electrolytic solution containing the reduction products and unreacted $CO_2$ is supplied through the third pipe 83 to the extractor 201 filled with the ionic liquid. The reduction products and $CO_2$ are extracted into the ionic liquid by stirring, but the stirring is not limitative since shaking or ultrasonic wave may be employed for the method of physically contacting the electrolytic solution and the ionic liquid.

From the viewpoint of extracting unreacted $CO_2$, it is preferable to apply a pressure in addition to the stirring. With the pressurization, it is possible to efficiently dissolve $CO_2$ into the ionic liquid. It takes time to finish absorption when the pressure for the pressurization is too low, while operation control is difficult when the pressure is too high. Therefore, the pressure may be 0 MPa or more and 50 MPa or less, preferably an ordinary pressure (e.g. 0.1 MPa) or more and 25 MPa or less, more preferably an ordinary pressure or more and 12 MPa or less.

Also, in view of heat stability of the reduction product and the ionic liquid, and fluidity of the solution, temperature conditions for the pressurization may be −50° C. or more and 250° C. or less, preferably 0° C. or more and 200° C. or less, more preferably an ordinary temperature (e.g. 15° C. to 25° C.) or more and 100° C. or less.

The ionic liquid to be used as the extraction solvent is an ionic liquid comprising a cation and an anion. The ionic liquid may be a compound containing an organic cation selected from an alkyl ammonium cation, a pyridinium cation, a piperidinium cation, a pyrrolidinium cation, an imidazolium cation, and an alkyl phosphonium cation. Examples of the anion include those listed as the specific examples in the counter anion $Xa^-$ in the following formulas Ia to VIa. As the extraction solvent, two or more types of ionic liquids having different cationic structures or anionic structures may be mixed.

Specific examples of the ionic liquid which may be suitably used as the extraction solvent include compounds represented by any one of the following formulas Ia to VIa.

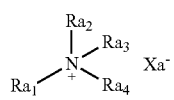
Ia

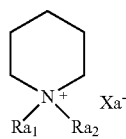
IIa

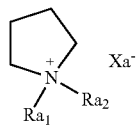
IIIa

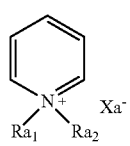
IVa

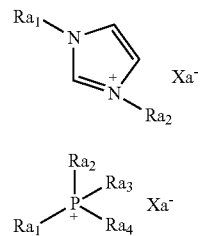

In the formulas Ia to VIa, $R_{1a}$, $R_{2a}$, $R_{3a}$, and $R_{4a}$ each independently represents an alkyl group or a cycloalkyl group, and $Xa^-$ represents a counter anion.

The ionic liquid is an ionic liquid comprising a cation and an anion as described above and is a compound cationic molecule of which has disproportionate lengths of alkyl chains. As a result of enhancing an asymmetric property of the molecular structure of the cationic molecules by the unequal alkyl chain lengths, a solution state is achieved.

As the alkyl group represented by $R_{1a}$, $R_{2a}$, $R_{3a}$, and $R_{4a}$, an alkyl group having 1 to 12 carbon atoms is preferred, and an alkyl group having 1 to 6 carbon atoms is more preferred. Also, as the cycloalkyl group represented by $R_{1a}$, $R_{2a}$, $R_{3a}$, and $R_{4a}$, a cycloalkyl group having 3 to 8 carbon atoms is preferred, and a cycloalkyl group having 4 to 6 carbon atoms is more preferred.

Also, $R_{1a}$ may preferably be a group having a smaller number of carbon atoms than $R_{2a}$, $R_{3a}$, and $R_{4a}$. Specifically, the difference in number of carbon atoms between $R_{1a}$ and $R_{2a}$, $R_{3a}$, and $R_{4a}$ may preferably be 1 or more and 11 or less, more preferably 1 or more and 5 or less.

Examples of the counter anion represented by $Xa^-$ include $BF_4^-$, $PF_6^-$, fuloromethanesulfonate anion ($CF_3SO_3^-$), bis-trifluoromethanesulfonylimide anion (($CF_3SO_3)_2N^-$), $(CN)_2N^-$, and $(CN)_4B^-$.

Solubility of the ionic liquid to water changes depending on a combination of a cation and an anion. Since it is desirable that the ionic liquid to be used as the extraction solvent in the extractor 201 is not dissolved into water, the combination of cation and anion may appropriately be selected from among those that attain hydrophobicity.

Specific examples of the ionic liquid to be used as the extraction solvent include the followings. 1-ethyl-3-methylimidazolium bistrifluoromethanesulfonylimide, 1-propyl-3-methylimidazolium bistrifluoromethanesulfonylimide, 1-butyl-3-methylimidazolium bistrifluoromethanesulfonylimide, 1-pentyl-3-methylimidazolium bistrifluoromethanesulfonylimide, 1-hexyl-3-methylimidazolium bistrifluoromethanesulfonylimide, 1-octyl-3-methylimidazolium bistrifluoromethanesulfonylimide, 1-nonyl-3-methylimidazolium bistrifluoromethanesulfonylimide, 1-decyl-3-methylimidazolium bistrifluoromethanesulfonylimide, 1-undecyl-3-methylimidazolium bistrifluoromethanesulfonylimide, 1-dodecyl-3-methylimidazolium bistrifluoromethanesulfonylimide, 1-ethyl-3-propylimidazolium hexafluorophosphate, 1-ethyl-3-hexylimidazolium tetracyanoborate, 1-ethyl-3-octylimidazolium trifluoromethanesulfonate, 1-ethyl-3-decylimidazolium tetrafluoroborate, 1-dodecyl-3-methylimidazolium dicyanamide, 1-ethyl-4-methylpyridinium bistrifluoromethanesulfonylimide, 1-propyl-4-methylpyridinium bistrifluoromethane-sulfonylimide, 1-butyl-4-methylpyridinium bistrifluoromethanesulfonylimide, 1-pentyl-4-methylpyridinium bistrifluoromethanesulfonylimide, 1-hexyl-4- methylpyridinium bistrifluoromethanesulfonylimide, 1-octyl-4-methylpyridinium bistrifluoromethanesulfonylimide, 1-nonyl-4-methylpyridinium bistrifluoromethane-sulfonylimide, 1-decyl-4-methylpyridinium bistrifluoromethanesulfonylimide, 1-undecyl-4-methylpyridinium bistrifluoromethanesulfonylimide, dodecyl-4-methylpyridinium bistrifluoromethanesulfonylimide, 1-ethyl-4-propylpyridinium hexafluorophosphate, 1-ethyl-4-pentylpyridinium tetracyanoborate, 1-ethyl-4-nonylpyridinium trifluoromethansulfonate, 1-ethyl-4-undecylpyridinium tetrafluoroborate, 1-ethyl-4-dodecylpyridiniumdicyanamide, 1-ethyl-1-methylpyrrolidinium bistrifluoromethanesulfonylimide, 1-propyl-1-methylpyrrolidinium bistrifluoromethane-sulfonylimide, 1-butyl-1-methylpyrrolidinium bistrifluoromethanesulfonylimide, 1-pentyl-1-methylpyrrolidinium bistrifluoromethanesulfonylimide, 1-hexyl-1-methylpyrrolidinium bistrifluoromethanesulfonylimide, 1-octyl-1-methylpyrrolidinium bistrifluoromethanesulfonylimide, 1-nonyl-1-methylpyrrolidinium bistrifluoromethanesulfonylimide, 1-decyl-1-methylpyrrolidinium bistrifluoromethanesulfonylimide, 1-undecyl-1-methylpyrrolidinium bistrifluoromethanesulfonylimide, 1-dodecyl-1-methylpyrrolidinium bistrifluoromethanesulfonylimide, 1-ethyl-1-butylpyrrolidinium hexafluorophosphate, 1-ethyl-1-hexylpyrrolidinium tetracyanoborate, 1-ethyl-1-octlpyrrolidinium trifluoromethansulfonate, 1-ethyl-1-decylpyrrolidinium tetrafluoroborate, 1-ethyl-1-dodecylpyrrolidiniumpyridinium dicyanamide, 1-ethyl-1-methylpiperidinium bistrifluoromethanesulfonylimide, 1-propyl-1-methylpiperidinium bistrifluoromethane-sulfonylimide, 1-butyl-1-methylpiperidinium bistrifluoromethanesulfonylimide, 1-pentyl-1-methylpiperidinium bistrifluoromethanesulfonylimide, 1-hexyl-1-methylpiperidinium bistrifluoromethanesulfonylimide, 1-octyl-1-methylpiperidinium bistrifluoromethanesulfonylimide, 1-nonyl-1-methylpiperidinium bistrifluoromethanesulfonylimide, 1-decyl-1-methylpiperidinium bistrifluoromethanesulfonylimide, 1-undecyl-1-methylpiperidinium bistrifluoromethanesulfonylimide, 1-dodecyl-1-methylpiperidinium bistrifluoromethanesulfonylimide, 1-ethyl-1-propylpiperidinium hexafluorophosphate, 1-ethyl-1-butylpiperidinium tetracyanoborate, 1-ethyl-1-hexylpiperidinium trifluoromethansulfonate, 1-ethyl-1-decylpiperidinium tetrafluoroborate, 1-ethyl-1-dodecylpiperidinium bisdicyanamide, ethyltrimethylammonium bistrifluoromethanesulfonylimide, propyltrimethylammonium bistrifluoromethane-sulfonylimide, butyltrimethylammonium bistrifluoro-methanesulfonylimide, pentyltrimethylammonium bistrifluoromethanesulfonylimide, hexyltrimethylammonium bistrifluoromethanesulfonylimide, octyltrimethylammonium bistrifluoromethanesulfonylimide, nonyltrimethylammonium bistrifluoromethanesulfonylimide, decyltrimethylammonium bistrifluoromethanesulfonylimide, undecyltrimethylammonium bistrifluoromethane-sulfonylimide, dodecyltrimethylammonium bistrifluoro-methanesulfonylimide, butyltriethylammonium hexafluorophosphate, hexyltriethylammonium tetracyanoborate, octyltriethylammonium fluoromethanesulfonate, decyltriethylammonium tetrafluoroborate, ethyltributylammonium dicyanamide, ethyltrimethylphosphonium bistrifluoromethanesulfonylimide, propyltrimethylphosphonium bistrifluoro-methanesulfonylimide, butyltrimethylphosphonium bistrifluoromethanesulfonylimide, pentyltrimethyl-phosphonium bistrifluoromethanesulfonylimide, hexyltrimethylphosphonium bistrifluoromethanesulfonylimide, octyltrimethylphosphonium bistrifluoromethanesulfonylimide, nonyltrimethylphosphonium bistrifluoromethanesulfonylimide, decyltrimethylphosphonium bistrifluoromethanesulfonylimide, undecyltrimethylphosphonium bistrifluoro-methanesulfonylimide, dodecyltrimethylphosphonium bistrifluoromethanesulfonylimide, butyltriethylphosphonium hexafluorophosphate, hexyltriethylphosphonium tetracyanoborate, octyltriethylphosphonium fluoromethanesulfonate, decyltriethylphosphonium tetrafluoroborate, and ethyltributylphosphoniumdicyanamide.

The electrolytic solution from which the reduction products and $CO_2$ are extracted and removed and the ionic liquid containing the reduction products and $CO_2$, which are generated in the extractor 201, are respectively discharged through separate pipes. Although the different situation is caused depending on the densities of the electrolytic solution and the ionic liquid, when the ionic liquid containing the reduction products and $CO_2$ has a density larger than that of the electrolytic solution, the ionic liquid is accumulated in a lower part of the extractor 201 to be discharged to the outside of the apparatus through the pipe 100a. On the other hand, the electrolytic solution accumulated in an upper part of the extractor 201 is discharged through the pipe 101a separately from the ionic liquid.

The ionic liquid discharged from the lower part of the extractor 201 is supplied to the carbon dioxide separation column 202 through the pipe 100a. In the carbon dioxide separation column 202, $CO_2$ contained in the ionic liquid is separated and recovered by decompressing the ionic liquid to a pressure lower than the pressure applied for causing the ionic liquid to absorb $CO_2$ in the extractor 201. Specifically, the pressure may be reduced by a range of, but not limited thereto, from 0 MPa or more to 50 MPa or less, preferably from 10 MPa or more to 35 MPa or less, more preferably from 15 MPa or more to 25 MPa or less, from the pressure at which the ionic liquid absorbed $CO_2$, and the pressure reduction range may appropriately be selected in view of $CO_2$ release characteristics of the ionic liquid, for example.

The ionic liquid from which $CO_2$ has been separated and removed by the carbon dioxide separation column 202 is then supplied to the rectifying column 72 through the pipe 100b. In the rectifying column 72, the reduction products contained in the ionic liquid may be separated from the ionic liquid by distillation employing a conventional method. Specifically, the rectification may be performed by distillation under reduced pressure utilizing a difference in boiling points. Thus, the reduction products having lower boiling point than water such as methanol and ethanol and the reduction products having higher boiling point than water such as ethylene glycol are withdrawn from the pipe 101c arranged on an upper part of the rectifying column 72, and the ionic liquid that has almost no vapor pressure is recovered from a bottom part of the rectifying column 72.

In one aspect, as shown in FIG. 3, the rectifying column 72 and the extractor 201 are connected to each other by the sixth pipe 100c in the reduction product producing system 60. The ionic liquid from which the reduction products have been separated and removed by the rectifying column 72 is recovered from the bottom part of the rectifying column 72 to fill the extractor 201 through the sixth pipe 100c.

In another aspect, as shown in FIG. 3, the reduction product producing system 60 may be provided with the preparation tank 74 serving to prepare the electrolytic solution in which $CO_2$ is dissolved by using the electrolytic solution from which the reduction products and $CO_2$ have been separated and removed by the extractor 201 and $CO_2$ separated from the ionic liquid by the carbon dioxide separation column 202.

The preparation tank 74 is connected to the extractor 201 and the carbon dioxide separation column 202 respectively by the pipe 101a and the pipe 101b.

The electrolytic solution containing dissolved $CO_2$ prepared in the preparation tank 74 is supplied to the storage tank 64 through the seventh pipe 84 having a valve.

In yet another aspect, the separation unit configured to recover reduction products from the electrolytic solution having increased concentration of $CO_2$ reduction products in the reduction product producing system 60 has another configuration. The separation unit having another configuration will be described below using FIG. 4.

Figure 4:
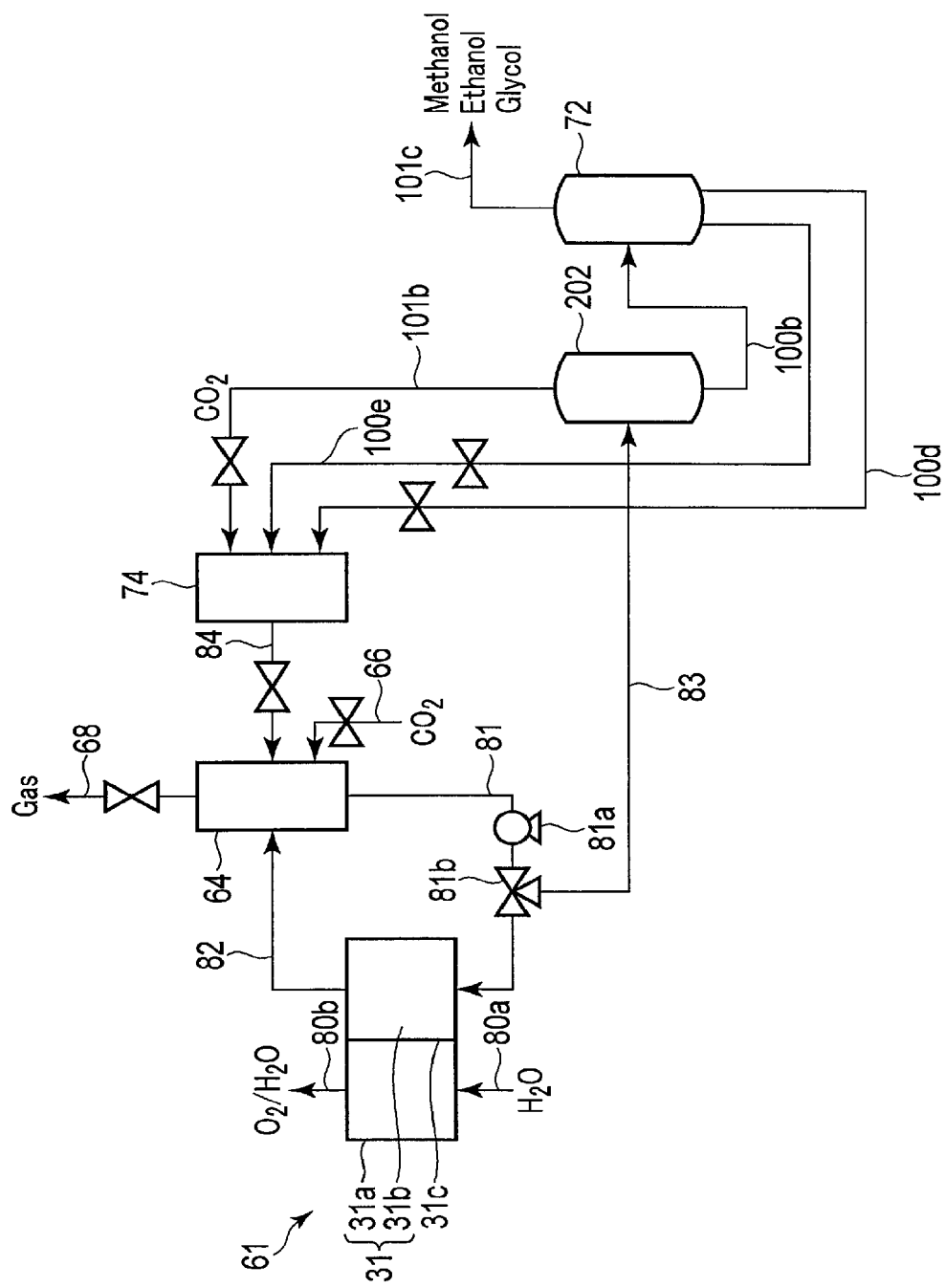
FIG. 4 is a block diagram showing another example of a configuration of producing system of reduction product according to embodiments.

In the reduction product producing system 60 shown in FIG. 4, the separation unit is connected to the electrolytic solution supply unit by the third pipe 83 through the three-way valve 81b.

The separation unit is provided with: the carbon dioxide separation column 202 configured to separate unreacted $CO_2$ from the electrolytic solution having increased concentration of $CO_2$ reduction products; and the rectifying column 72 configured to separate reduction products from the electrolytic solution from which $CO_2$ has been separated by the carbon dioxide separation column 202.

The electrolytic solution used in the reduction product producing system 60 shown in FIG. 4 may preferably have propertied of lowering a reduction potential of $CO_2$, of having high ion conductivity, and of absorbing $CO_2$. As the electrolytic solution, an aqueous solution of the ionic liquid may be used, for example.

The ionic liquid to be used as the electrolyte in the electrolytic solution is an ionic liquid comprising a cation and an anion. The ionic liquid may be a compound containing an organic cation selected from an alkyl ammonium cation, a pyridinium cation, a piperidinium cation, a pyrrolidinium cation, an imidazolium cation, and an alkyl phosphonium cation. Examples of the anion include those listed as the specific examples in the counter anion $Xb^-$ in the following formulas Ib to VIb, for example. As the electrolyte in the electrolytic solution, two or more types of ionic liquids having different cationic structures or anionic structures may be mixed.

Specific examples of the ionic liquid which is suitably used as the electrolyte include compounds represented by any one of the following formulas Ib to VIb.

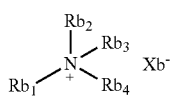

Ib

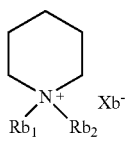

IIb

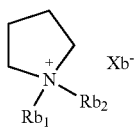

IIIb

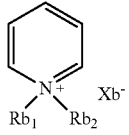

IVb

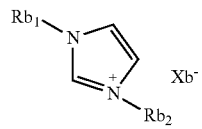

Vb

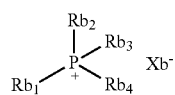

VIb

In the formulas Ib to VIb, $R_{1b}$, $R_{2b}$, $R_{3b}$, and $R_{4b}$ each independently represents an alkyl group or a cycloalkyl group, and $Xb^-$ represents a counter anion.

The ionic liquid is an ionic liquid comprising a cation and an anion as described above and is, in one embodiment, a compound cationic molecule of which has disproportionate lengths of alkyl chains. As a result of enhancing an asymmetric property of the molecular structure of the cationic molecules by the unequal alkyl chain lengths, a solution state is achieved.

As the alkyl group represented by $R_{1b}$, $R_{2b}$, $R_{3b}$, and $R_{4b}$, an alkyl group having 1 to 12 carbon atoms is preferred, and an alkyl group having 1 to 6 carbon atoms is more preferred. Also, as the cycloalkyl group represented by $R_{1b}$, $R_{2b}$, $R_{3b}$, and $R_{4b}$, a cycloalkyl group having 3 to 8 carbon atoms is preferred, and a cycloalkyl group having 4 to 6 carbon atoms is more preferred.

Also, $R_{1b}$ may preferably be a group having a smaller number of carbon atoms than $R_{2b}$, $R_{3b}$, and $R_{4b}$. Specifically, the difference in number of carbon atoms between $R_{1b}$ and $R_{2b}$, $R_{3b}$, and $R_{4b}$ may preferably be 1 or more and 11 or less, more preferably 1 or more and 5 or less.

Examples of the counter anion represented by $Xb^-$ include $Cl^-$, $Br^-$, $I^-$, $BF_4^-$, $(CN)_4B^-$, and $(CN)_2N^-$.

Solubility of the ionic liquid to water changes depending on a combination of the cation and the anion. Since it is desirable that the ionic liquid to be used for the electrolytic solution is dissolved into water, the combination of cation and anion may appropriately be selected from among those that attain hydrophilicity.

Specific examples of the ionic liquid to be used as the extraction solvent in the electrolytic solution include the followings. 1-ethyl-3-methylimidazolium tetrafluoroborate, 1-propyl-3-methylimidazolium tetrafluoroborate, 1-butyl-3-methylimidazolium tetrafluoroborate, 1-pentyl-3-methylimidazolium tetrafluoroborate, 1-hexyl-3-methylimidazolium tetrafluoroborate, 1-octyl-3-methylimidazolium tetrafluoroborate, 1-nonyl-3-methylimidazolium tetrafluoroborate, 1-decyl-3-methylimidazolium tetrafluoroborate, 1-undecyl-3-methylimidazolium tetrafluoroborate, 1-dodecyl-3-methylimidazolium tetrafluoroborate, 1-ethyl-3-propylimidazolium chloride, 1-ethyl-3-hexylimidazolium bromide, 1-ethyl-3-octylimidazolium iodide, 1-ethyl-3-decylimidazolium tetracyanoborate, 1-dodecyl-3-methylimidazolium dicyanamide, 1-ethyl-4-methylpyridinium tetrafluoroborate, 1-propyl-4-methylpyridinium tetrafluoroborate, 1-butyl-4-methylpyridinium tetrafluoroborate, 1-pentyl-4-methylpyridinium tetrafluoroborate, 1-hexyl-4-methylpyridinium tetrafluoroborate, 1-octyl-4-methylpyridinium tetrafluoroborate, 1-nonyl-4-methylpyridinium tetrafluoroborate, 1-decyl-4-methylpyridinium tetrafluoroborate, 1-undecyl-4-methylpyridinium tetrafluoroborate, 1-dodecyl-4- methylpyridinium tetrafluoroborate, 1-ethyl-4-propylpyridinium chloride, 1-ethyl-4-pentylpyridinium bromide, 1-ethyl-4-nonylpyridinium iodide, 1-ethyl-4-undecylpyridinium tetracyanoborate, 1-ethyl-4-dodecylpyridinium dicyanamide, 1-ethyl-1-methylpyrrolidinium tetrafluoroborate, 1-propyl-1-methylpyrrolidinium tetrafluoroborate, 1-butyl-1-methylpyrrolidinium tetrafluoroborate, 1-pentyl-1-methylpyrrolidinium tetrafluoroborate, 1-hexyl-1-methylpyrrolidinium tetrafluoroborate, 1-octyl-1-methylpyrrolidinium tetrafluoroborate, 1-nonyl-1-methylpyrrolidinium tetrafluoroborate, 1-decyl-1-methylpyrrolidinium tetrafluoroborate, 1-undecyl-1-methylpyrrolidinium tetrafluoroborate, 1-dodecyl-1-methylpyrrolidinium tetrafluoroborate, 1-ethyl-1-butylpyrrolidinium bromide, 1-ethyl-1-hexylpyrrolidinium bromide, 1-ethyl-1-octylpyrrolidinium iodide, 1-ethyl-1-decylpyrrolidinium tetracyanoborate, 1-ethyl-1-dodecylpyrrolidinium pyridinium dicyanamide, 1-ethyl-1-methylpiperidinium tetrafluoroborate, 1-propyl-1-methylpiperidinium tetrafluoroborate, 1-butyl-1-methylpiperidinium tetrafluoroborate, 1-pentyl-1-methylpiperidinium tetrafluoroborate, 1-hexyl-1-methylpiperidinium tetrafluoroborate, 1-octyl-1-methylpiperidinium tetrafluoroborate, 1-nonyl-1-methylpiperidinium tetrafluoroborate, 1-decyl-1-methylpiperidinium tetrafluoroborate, 1-undecyl-1-methylpiperidinium tetrafluoroborate, 1-dodecyl-1-methylpiperidinium tetrafluoroborate, 1-ethyl-1-propylpiperidinium chloride, 1-ethyl-1-butylpiperidinium bromide, 1-ethyl-1-hexylpiperidinium iodide, 1-ethyl-1-decylpiperidinium tetracyanoborate, 1-ethyl-1-dodecylpiperidinium bisdicyanamide, ethyltrimethylammonium tetrafluoroborate, propyltrimethylammonium tetrafluoroborate, butyltrimethylammonium tetrafluoroborate, pentyltrimethylammonium tetrafluoroborate, hexyltrimethylammonium tetrafluoroborate, octyltrimethylammonium tetrafluoroborate, nonyltrimethylammonium tetrafluoroborate, decyltrimethylammonium tetrafluoroborate, undecyltrimethylammonium tetrafluoroborate, dodecyltrimethylammonium tetrafluoroborate, butyltriethylammonium chloride, hexyltriethylammonium bromide, octyltriethylammonium iodide, decyltriethylammonium tetracyanoborate, ethyltributylammonium dicyanamide, ethyl trimethylphosphonium tetrafluoroborate, propyltrimethylphosphonium tetrafluoroborate, butyltrimethylphosphonium tetrafluoroborate, pentyltrimethyl-phosphonium tetrafluoroborate, hexyltrimethylphosphonium tetrafluoroborate, octyltrimethylphosphonium tetrafluoroborate, nonyltrimethylphosphonium tetrafluoroborate, decyltrimethylphosphonium tetrafluoroborate, undecyltrimethylphosphonium tetrafluoroborate, dodecyltrimethylphosphonium tetrafluoroborate, butyltriethylphosphonium bromide, hexyltriethyl-phosphonium chloride, octyltriethylphosphonium iodide, decyltriethylphosphonium tetracyanoborate, and ethytributylphosphonium dicyanamide.

A concentration of the electrolyte in the electrolytic solution, i.e. a concentration of the ionic liquid, may appropriately be determined in view of solubility of $CO_2$, ion conductivity, and fluidity. For example, the concentration may preferably be within the range of 0.1 to 15 mol/L.

In the reduction product producing system 60 shown in FIG. 4, when the above-described aqueous solution of ionic liquid is used as the electrolytic solution, the supply of $CO_2$ to the electrolytic solution by the carbon dioxide supply unit may be performed by the following means in addition to the means of directly spraying described in the foregoing.

Specifically, in the storage tank 64, it is possible to dissolve $CO_2$ into the aqueous solution of the ionic liquid as the electrolytic solution by pressurizing $CO_2$. It takes time to finish absorption when the pressure for the pressurization is too low, while operation control is difficult when the pressure is too high. Therefore, the pressure may be 0 MPa or more and 50 MPa or less, preferably an ordinary pressure (e.g. 0.1 MPa) or more and 25 MPa or less, more preferably an ordinary pressure or more and 12 MPa or less.

Also, in view of heat stability of the reduction products and the ionic liquid, and fluidity of the solution, temperature conditions for the pressurization may be −50° C. or more and 250° C. or less, preferably 0° C. or more and 200° C. or less, more preferably an ordinary temperature (e.g. 15° C. to 25° C.) or more and 100° C. or less.

In the separation unit in the reduction product producing system 60 shown in FIG. 4, the electrolytic solution fed to the third pipe 83 from the electrolytic solution supply unit through the three-way valve 81b is firstly supplied to the carbon dioxide separation column 202.

In the carbon dioxide separation column 202, unreacted $CO_2$ is separated from the electrolytic solution (aqueous solution of ionic liquid) having increased concentration of $CO_2$ reduction product. $CO_2$ dissolved in the aqueous solution of the ionic liquid may be separated from the ionic liquid by a conventional method. For example, when the supply of $CO_2$ to the electrolytic solution in the carbon dioxide supply unit is performed by pressurizing $CO_2$ to the aqueous solution of the ionic liquid in the storage tank 64, the following method may be performed.

In carbon dioxide separation column 202, $CO_2$ contained in the aqueous solution of the ionic liquid is separated and recovered by decompressing the aqueous solution of the ionic liquid to a pressure lower than that applied for causing the aqueous solution of the ionic liquid to absorb $CO_2$ in the storage tank 64. Specifically, the pressure may be reduced by a range of, but not limited thereto, from 0 MPa or more to 50 MPa or less, preferably from 10 MPa or more to 35 MPa or less, more preferably from 15 MPa or more to 25 MPa or less, from the pressure at which the aqueous solution of the ionic liquid absorbed $CO_2$, where the range of reducing pressure may appropriately be selected in view of $CO_2$ release characteristics of the ionic liquid, for example.

The aqueous solution of the ionic liquid from which $CO_2$ has been separated and removed by the carbon dioxide separation column 202 is then supplied to the rectifying column 72 through the pipe 100b. In the rectifying column 72, the reduction products contained in the aqueous solution of the ionic liquid may be separated from the ionic liquid by distillation employing a conventional method. Specifically, the rectification may be performed by distillation under reduced pressure utilizing a difference in boiling points. Thus, the reduction products having lower boiling point than water such as methanol and ethanol and the reduction products having higher boiling point than water such as ethylene glycol are withdrawn from the pipe 101c arranged on the upper part of the rectifying column 72, and the aqueous solution of the ionic liquid that has almost no vapor pressure is recovered from the bottom part of the rectifying column 72.

In one aspect, as shown in FIG. 4, the reduction product producing system 60 may be provided with the preparation tank 74 serving to prepare the electrolytic solution in which $CO_2$ is dissolved by using $CO_2$ separated from the electrolytic solution (aqueous solution of ionic liquid) by the carbon dioxide separation column 202 and the electrolytic solution from which the reduction products have been separated and removed by the rectifying column 72.

At the carbon dioxide separation column 202, $CO_2$ separated from the aqueous solution of the ionic liquid is supplied to the preparation tank 74 through the pipe 101b.

The aqueous solution of the ionic liquid recovered from the bottom part of the rectifying column 72, from which the reduction products have been separated, is separated into the ionic liquid and water, which are respectively passed through the pipe 100d and the pipe 100e to be charged to the preparation tank 74.

In the preparation tank 74, $CO_2$, the ionic liquid, and water are supplied respectively from the pipe 101b, the pipe 100d, and the pipe 100e, so that an electrolytic solution containing $CO_2$, the ionic liquid, and water is prepared. In order to effectively dissolve $CO_2$ in, the aqueous solution of the ionic liquid, it is possible to pressurize the $CO_2$ to the aqueous solution of the ionic liquid. It takes time to finish absorption when the pressure for the pressurization is too low, while operation control is difficult when the pressure is too high. Therefore, the pressure may be 0 MPa or more and 50 MPa or less, preferably an ordinary pressure (e.g. 0.1 MPa) or more and 25 MPa or less, more preferably an ordinary pressure or more and 12 MPa or less.

Also, in view of heat stability of the reduction products and the ionic liquid, and fluidity of the solution, temperature conditions for the pressurization may be −50° C. or more and 250° C. or less, preferably 0° C. or more and 200° C. or less, more preferably an ordinary temperature (e.g. 15° C. to 25° C.) or more and 100° C. or less.

The electrolytic solution containing the $CO_2$ the ionic liquid, and water prepared in the preparation tank 74 is supplied to the storage tank 64 through a seventh pipe 84 provided with a valve.

In the reduction product producing system according to the above-described embodiment, the electrolytic solution containing the reduction products is circulated between the storage tank 64 and the reduction reaction electrolytic bath 31b. In addition, carbon dioxide that is the material to be reduced is fed to the electrolytic solution. Therefore, the reduction reaction is continued in the reduction reaction electrolytic bath 31b to increase the concentration of the reduction products contained in the electrolytic solution. Since the produced reduction products are not involved in the reduction reaction in the reduction reaction electrolytic bath 31b, it is possible to continue the reduction reaction irrespective of the concentration of the reduction products in the electrolytic solution.

When the concentration of the reduction products contained in the electrolytic solution is low, the energy to be inputted for recovering the reduction products from the electrolytic solution becomes larger than the energy amount stored in the reduction products to raise a risk that it is difficult to make profit from the production cost. However, the reduction product producing system according to the embodiment enables to obtain the electrolytic solution containing the reduction products at a high concentration. Therefore, recovery of the reduction products with high efficiency is realized. In order to enhance the recovery efficiency, it is preferable to supply the electrolytic solution having reduction products in a concentration of 0.01 to 50 wt % to the separation unit. The concentration of the reduction products may preferably be the concentration of ethylene glycol.

Also, when various reduction products each being in a small amount are contained in the electrolytic solution, the separation step becomes complicated, and the energy to be inputted for recovering the reduction products from the electrolytic solution becomes larger than the energy amount stored in the reduction products to raise a risk that it is difficult to make profit from the production cost. However, since the electrolytic solution in the reduction product producing system according to the embodiment is circulated between the storage tank 64 and the reduction reaction electrolytic bath 31b, the reduction reaction of the carbon dioxide reduction products is continuously performed. Therefore, the multi-electron reduction proceeds to convert the carbon dioxide into methanol and ethanol and further into ethylene glycol. Therefore, it is possible to realize high recovery efficiency by employing the simple separation steps.

[Chemical Reaction Apparatus]

Hereinafter, the chemical reaction apparatus 61 will be described with reference to FIGS. 5 to 11. The chemical reaction apparatus 61 has a chemical reaction cell 30 having an oxidation catalyst layer and a reduction catalyst layer, the oxidation reaction electrolytic bath 31a, the reduction reaction electrolytic bath 31b, and an ion migration pathway that separates the electrolytic solution and enables ion migration between the oxidation reaction electrolytic bath 31a and the reduction reaction electrolytic bath 31b.

Firstly, the chemical reaction cell 30 will be described with reference to FIGS. 5 to 7. The chemical reaction cell is provided with an oxidation catalyst layer 19, a reduction catalyst layer 20, and a power source element connected to both of the oxidation catalyst layer 19 and the reduction catalyst layer 20. Also, the chemical reaction cell 30 has a separator that partitions between the oxidation catalyst layer 19 and the reduction catalyst layer 20. The power source element applies a voltage required for the electrolysis by supplying power to the oxidation catalyst layer 19 and the reduction catalyst layer 20.

The power source element may be an external power source, but it may preferably be a semiconductor layer capable of charge separation by light energy. As the power source element, a solar cell may be used, for example. The semiconductor layer may preferably be disposed between the oxidation catalyst layer 19 and the reduction catalyst layer 20. When the semiconductor layer is disposed between the oxidation catalyst layer 19 and the reduction catalyst layer 20, the semiconductor layer is used as the separator.

Figure 5:
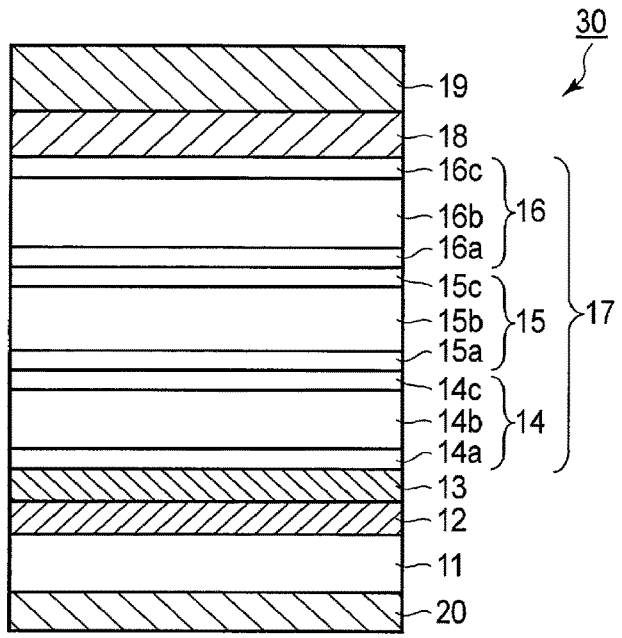
FIG. 5 is a cross-sectional view showing a configuration of a chemical reaction cell used in the producing system of reduction product according to an embodiment.

FIG. 5 is a cross-sectional view showing a configuration of the chemical reaction cell 30. As shown in FIG. 5, the chemical reaction cell 30 is a layered structure in which the reduction catalyst layer 20, a substrate 11, a reflection layer 12, a reduction electrode layer 13, a multi-junction solar cell 17, an oxidation electrode layer 18, and the oxidation catalyst layer 19 are stacked in this order. In the chemical reaction cell 30, the side of the reduction catalyst layer 20 is a bottom surface, and the side of the oxidation catalyst layer 19 is a top surface on which the light is incident.

The substrate 11 is provided for supporting the chemical reaction cell 30 and enhancing mechanical strength of the chemical reaction cell 30. The substrate 11 is formed of a material having electroconductivity. For example, the substrate 11 may be formed of a metal plate made from a metal selected from the group consisting of Au, Ag, Cu, Pt, Zn, Fe, Ti, Sn, In, Bi, and Ni or an alloy plate comprising at least one type of these metals. As the alloy plate, an alloy plate such as an SUS may be used. Alternatively, the substrate 11 may be formed of a resin having electroconductivity. Also, the substrate 11 may be formed of a semiconductor substrate of Si, or Ge. Further, the substrate 11 may be formed of an ion-exchange membrane.

The reflection layer 12 is formed on a surface of the substrate 11. The reflection layer 12 is formed of a material capable of light reflection. For example, the reflection layer 12 may be formed of a metal layer or a distributed Bragg reflection layer comprising a semiconductor multilayer film. The reflection layer 12 is disposed between the substrate 11 and the multi-junction solar cell 17. Therefore, the reflection layer 12 is capable of reflecting light not absorbed by the multi-junction solar cell 17 to make the reflected light incident to the multi-junction solar cell 17 again. Thus, optical absorptance in the multi-junction solar cell 17 is improved.

The reduction electrode layer 13 is disposed on the reflection layer 12 and is sandwiched between the reflection layer 12 and an n-type semiconductor layer (amorphous silicon layer 14a described later) of the multi-junction solar cell 17. Therefore, the reduction electrode layer 13 may preferably be formed of a material capable of ohmic contact with the n-type semiconductor layer. The reduction electrode layer 13 is formed of a metal such as Ag, Au, Al, and Cu or an alloy comprising at least one of the metals. Alternatively, the reduction electrode layer 13 may be formed of a transparent electroconductive oxide such as ITO (indium tin oxide) or zinc oxide (ZnO), FTO (fluorine-doped tin oxide), AZO (aluminum-doped zinc oxide), and ATO (antimony-doped tin oxide). Also, the reduction electrode layer 13 may have a structure in which the metal and the transparent electroconductive oxide are layered, a structure in which the metal and another electroconductive material are made into a composite, or a structure in which the transparent electroconductive oxide and another electroconductive material are made into a composite.

The multi-junction solar cell 17 is disposed on the reduction electrode layer 13. The multi-junction solar cell 17 has a structure in which a first solar cell 14, a second solar cell 15, and a third solar cell 16 are stacked in this order from the reduction electrode layer 13. A pin junction semiconductor is used for each of the solar cells. The first solar cell 14, the second solar cell 15, and the third solar cell 16 have different light absorption wavelengths. By stacking them in a planar shape, the multi-junction solar cell 17 is enabled to absorb light of a wide range of wavelengths of solar light. Thus, it is possible to efficiently utilize solar light energy. Also, since the solar cells are connected in series, it is possible to attain a high open voltage.

The first solar cell 14 includes an n-type amorphous silicon (a-Si) layer 14a, an intrinsic amorphous silicon germanium (a-SiGe) layer 14b, and a p-type microcrystalline silicon (μc-Si) layer 14c in this order from the reduction electrode layer 13. The a-SiGe layer 14b is the layer that absorbs light in a short wavelength region of about 400 nm. Therefore, charge separation occurs in the first solar cell 14 by the light energy in the short wavelength region.

The second solar cell 15 includes an n-type a-Si layer 15a, an intrinsic a-SiGe layer 15b, and a p-type μc-Si layer 15c in this order from the reduction electrode layer 13. The a-SiGe layer 15b is the layer that absorbs light in an intermediate wavelength region of about 600 nm. Therefore, charge separation occurs in the second solar cell 15 by the light energy in the intermediate wavelength region.

The third solar cell 16 includes an n-type a-Si layer 16a, an intrinsic a-Si layer 16b, and a p-type μc-Si layer 16c in this order from the reduction electrode layer 13. The a-Si layer 16b is the layer that absorbs light in a long wavelength region of about 700 nm. Therefore, charge separation occurs in the third solar cell 16 by the light energy in the long wavelength region.

In the multi-junction solar cell 17, the charge separation is caused by the light of the above wavelength regions. In short, holes are separated to a positive electrode side (top surface side), and electrons are separated to a negative electrode side (bottom surface side). Thus, an electromotive force is generated in the multi-junction solar cell 17.

Though the example of the multi-junction solar cell 17 formed of the layered structure of the three solar cells is described above, but is not limited thereto, and a multi-junction solar cell formed of a layered structure of two or more than four solar cells may be used. Alternatively, a solar cell may be used in place of the multi-junction solar cell 17. Also, though the example of the solar cells using the pin junction semiconductor is described above, a solar cell using a pn junction semiconductor may be used. Also, a semiconductor layer comprising GaAs, GaInP, AlGaInP, CdTe, or CuInGaSe may be used. Further, as the semiconductor layer, various types such as a monocrystalline layer, a polycrystalline layer, and an amorphous layer may be adopted.

The oxidation electrode layer 18 is disposed on the multi-junction solar cell 17 and is sandwiched between the p-type semiconductor layer of the multi-junction solar cell 17 and the oxidation catalyst layer 19. The oxidation electrode layer 18 may preferably be formed of a transparent material capable of ohmic contact with the p-type semiconductor layer. The oxidation electrode layer 18 is formed of a transparent electroconductive oxide such as ITO (indium tin oxide) or zinc oxide (ZnO), FTO (fluorine-doped tin oxide), AZO (aluminum-doped zinc oxide), and ATO (antimony-doped tin oxide). Also, the oxidation electrode layer 18 may have a structure in which the metal and the transparent electroconductive oxide are stacked, a structure in which the metal and another electroconductive material are made into a composite, or a structure in which the transparent electroconductive oxide and another electroconductive material are made into a composite.

The oxidation catalyst layer 19 is disposed on the positive electrode side of the multi-junction solar cell 17 and is formed on the oxidation electrode layer 18. The oxidation catalyst layer 19 oxidizes $H_2O$ to generate $O_2$ and $H^+$ when a hydrogen ion concentration of the electrolytic solution is lower than 7 (pH<7). On the other hand, the oxidation catalyst layer 19 oxidizes $OH^-$ to generate $O_2$ and $H_2O$ when a hydrogen ion concentration of the electrolytic solution is higher than 7 (pH>7). Therefore, the oxidation catalyst layer 19 is formed of a material that reduces activation energy required for the oxidation reaction. In other words, the oxidation catalyst layer 19 is formed of a material that reduces an overvoltage generated when allowing the reaction of extracting electrons by oxidizing $H_2O$ or $OH^-$.

Examples of the material include a binary metal oxide such as manganese oxide (Mn—O), iridium oxide (Ir—O), nickel oxide (Ni—O), cobalt oxide (Co—O), iron oxide (Fe—O), tin oxide (Sn—O), indium oxide (In—O), and a ruthenium oxide (Ru—O), a ternary metal oxide such as Ni—Co—O, La—Co—O, Ni—La—O, and Sr—Fe—O, and a quaternary metal oxide such as Pb—Ru—Ir—O and La—Sr—Co—O or a metal complex such as a Ru complex and an Fe complex.

The form of the oxidation catalyst layer 19 is not limited to the thin film form, and may be a lattice form, a particle form, or a wire form.

In the chemical reaction cell 30, irradiated light passes through the oxidation catalyst layer 19 and the oxidation electrode layer 18 to reach the multi-junction solar cell 17. Therefore, the oxidation electrode layer 18 and the oxidation catalyst layer 19 disposed on the light irradiation surface side has light transmissivity for the irradiated light. More specifically, the transmissivity of the oxidation electrode layer 18 and the oxidation catalyst layer 19 on the irradiation surface side is 10% or more, or more desirably 30% or more, of an irradiation amount of the irradiated light.

The reduction catalyst layer 20 is disposed on the negative electrode side of the multi-junction solar cell 17 and is formed on the back side of the substrate 11. The reduction catalyst layer 20 is the layer comprising a reduction catalyst for reducing carbon dioxide to produce reduction products. As the reduction catalyst, a first reduction catalyst or a second reduction catalyst described later is used. Reduction products to be generated by these reduction catalysts include carbon monoxide, formic acid, formaldehyde, methane, methanol, acetic acid, acetaldehyde, ethanol, and ethylene glycol. Also, the raw material for reduction is not limited to carbon dioxide, and the first reduction catalyst or the second reduction catalyst is capable of further reducing carbon monoxide, formic acid, formaldehyde, methane, methanol, acetic acid, acetaldehyde, and ethanol.

A protection layer having electroconductivity may be disposed on the surface of the multi-junction solar cell 17 or between the electrode layer and the catalyst layer on the incident side (i.e., between the oxidation electrode layer 18 and the oxidation catalyst layer 19 in the chemical reaction cell 30). The protection layer prevents corrosion of the multi-junction solar cell 17 in the redox reactions. As a result, the life of the multi-junction solar cell 17 is extended. Also, the protection layer may have light transmissivity as required. Examples of the protection layer include a dielectric thin film of $TiO_2$, $ZrO_2$, $Al_2O_3$, $SiO_2$, or $HfO_2$. A film thickness of the protection layer may preferably be 10 nm or less, more preferably 5 nm or less, in order to achieve electroconductivity by the tunneling effect.

Figure 6:
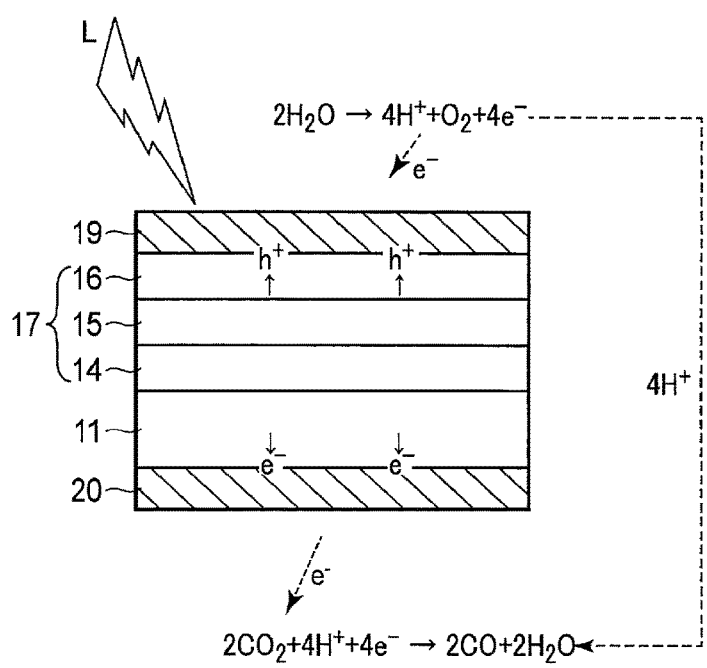
FIG. 6 is a cross-sectional view showing one example of an operating principle of the chemical reaction cell shown in FIG. 5.
Figure 7:
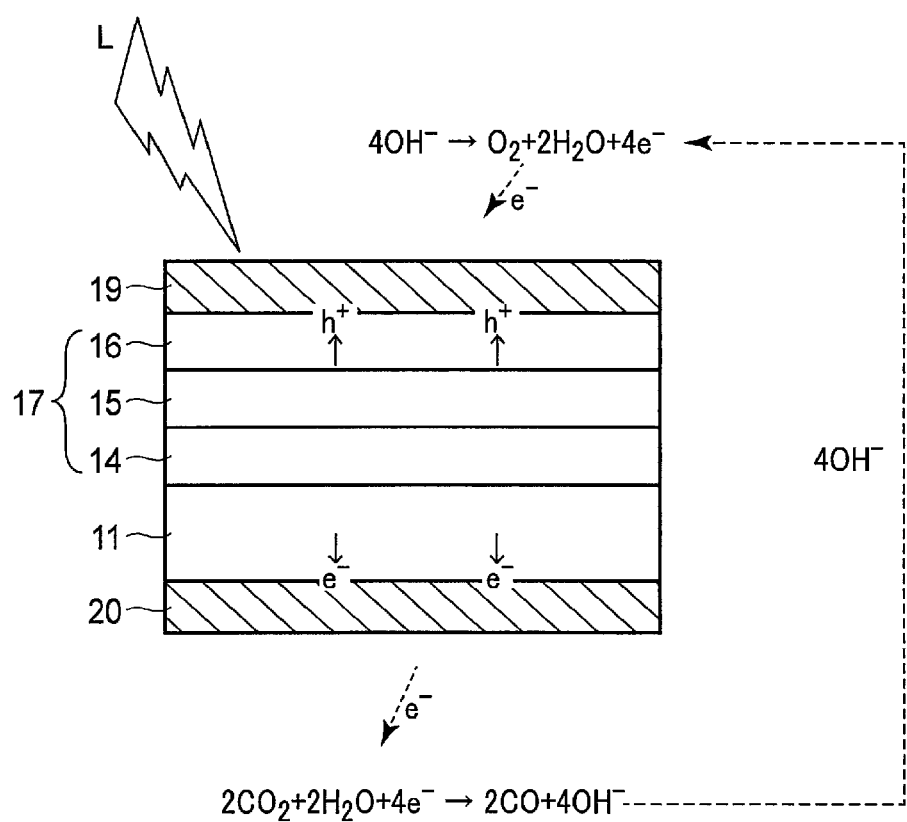
FIG. 7 is a cross-sectional view showing another example of the operating principle of the chemical reaction cell shown in FIG. 5.

FIGS. 6 and 7 are cross-sectional views explaining an operation principle of the chemical reaction cell 30. In the drawings, the reflection layer 12, the reduction electrode layer 13, and the oxidation electrode layer 18 are omitted.

As shown in FIGS. 6 and 7, when light (L) is incident on the surface side (the side of oxidation electrode layer 18), the incident light passes through the oxidation catalyst layer 19 (and the oxidation electrode layer 18) to reach the multi-junction solar cell 17. When the multi-junction solar cell 17 absorbs the light, a photoexcited electron and a hole are paired with the photoexcited electron are generated and then separated. Specifically, in each of the solar cells (the first solar cell 14, second solar cell 15, and third solar cell 16), the photoexcited electron is transferred to the n-type semiconductor layer side (the side of the reduction catalyst layer 20), and the hole generated as the pair for the photoexcited electron is transferred to the p-type semiconductor layer (the side of the oxidation catalyst layer 19). In short, the charge separation occurs. Thus, the electromotive force occurs in the multi-junction solar cell 17.

The photoexcited electron generated in the multi-junction solar cell 17 is used for the reduction reaction at the reduction catalyst layer 20 serving as the negative electrode. The hole is used for the oxidation reaction at the oxidation catalyst layer 19 serving as the positive electrode.

Shown in FIG. 6 is the example when the electrolytic solution is an acidic solution having a hydrogen ion concentration of lower than 7. In the vicinity of the oxidation catalyst layer 19, the reaction of the following formula (1) occurs. In short, $H_2O$ is oxidized to generate $O_2$ and $H^+$ as well as electrons. The thus-generated $H^+$ is transferred to the side of the reduction catalyst layer 20 through the ion migration pathway described later. In the vicinity of the reduction catalyst layer 20, the reaction of the following formula (2) occurs. In short, $CO_2$ is reduced by the transferred $H^+$ and electrons to generate carbon monoxide (CO) and $H_2O$.

$$2H_2O \rightarrow 4H^+ + O_2 + 4e^- \quad (1).$$

$$2CO_2 + 4H^+ + 4e^- \rightarrow 2CO + 2H_2O \quad (2).$$

On the other hand, shown in FIG. 7 is the example when the electrolytic solution is a basic solution having a hydrogen ion concentration of higher than 7. In the vicinity of the oxidation catalyst layer 19, the reaction of the following formula (3) occurs. In short, $OH^-$ is oxidized to generate $O_2$ and $H_2O$ as well as electrons. In the vicinity of the reduction catalyst layer 20, the reaction of the following formula (4) occurs. In short, $CO_2$ causes a reduction reaction by receiving the electrons together with $H_2O$ to generate carbon monoxide (CO) and $OH^-$. The $OH^-$ generated on the side of the reduction catalyst layer 20 is transferred to the side of the oxidation catalyst layer 19 through the ion migration pathway described later.

$$4OH^- \rightarrow O_2 + 2H_2O + 4e^- \quad (3).$$

$$2CO_2 + 2H_2O + 4e^- \rightarrow 2CO + 4OH^- \quad (4).$$

The multi-junction solar cell 17 is required to have an open voltage that is equal to or higher than a potential difference between a standard redox potential of the oxidation reaction that occurs at the oxidation catalyst layer 19 and a standard redox potential of the reduction reaction that occurs at the reduction catalyst layer 20. For example, when the hydrogen ion concentration (pH) of the reaction solution is 0, the standard redox potential in the oxidation reaction of the formula (1) is +1.23 [V], and the standard redox potential in the reduction reaction of the formula (2) is −0.1 [V]. Therefore, the open voltage of the multi-junction solar cell 17 is required to be 1.33 [V] or more.

More preferably, the open voltage is required to be equal to or higher than a potential including the overvoltage. More specifically, when each of the overvoltages in the oxidation reaction of the formula (1) and in the reduction reaction of the formula (2) is 0.2 [V], the open voltage may preferably be 1.73 [V] or more.

Though the reduction reaction of $CO_2$ to CO is shown as the reduction reactions in the formula (2) and the formula (4), the reactions are not limited thereto, and a reduction reaction of $CO_2$ to HCOOH, HCHO, $CH_4$, $CH_3OH$, $C_2H_5OH$, or $HOCH_2CH_2OH$ may occur. Each of the reduction reactions consumes $H^+$ or generates $OH^-$. Therefore, $H^+$ generated in the oxidation catalyst layer 19 cannot transfer to the reduction catalyst layer 20, the counter electrode thereof, or when $OH^-$ generated in the reduction catalyst layer 20 cannot transfer to the oxidation catalyst layer 19, the counter electrode thereof, overall reaction efficiency is degraded. In contrast, in the chemical reaction apparatus 61, it is possible to improve the transport of $H^+$ or $OH^-$ by providing the ion migration pathway for transferring $H^+$ or $OH^-$. Therefore, high photoreaction efficiency is realized.

Hereinafter, by using FIGS. 8 to 11, the chemical reaction apparatus 61 using the above-described chemical reaction cell 30 will be described. The redox reactions (above-described formulas (1) and (2)) when the electrolytic solution is the acidic solution having a hydrogen ion concentration of lower than 7 will be described as an example. When the electrolytic solution is the basic solution having a hydrogen ion concentration of higher than 7, the redox reactions according to the above-described formulas (3) and (4) occur.

FIG. 8 is a perspective view showing a configuration of the chemical reaction apparatus 61. FIG. 9 is a cross-sectional view showing the configuration of the chemical reaction apparatus 61. The chemical reaction apparatus 61 is provided with a photochemical reaction cell 30, an electrolytic bath 31 housing the photochemical reaction cell, and a flow path 41 for the electrolytic bath, the electrolytic bath flow path 41 being connected to the electrolytic bath 31 as an ion migration pathway. In FIG. 8, the ion migration pathway is omitted. The photochemical reaction cell 30 is provided with the stacked structure of the oxidation catalyst layer 19, the reduction catalyst layer 20, the multi-junction solar cell 17 formed between the layers, and the substrate 11 as described above.

The electrolytic bath 31 includes the oxidation reaction electrolytic bath 31a in which the oxidation catalyst layer 19 is disposed and the reduction reaction electrolytic bath 31b in which the reduction catalyst layer 20 is disposed. In the oxidation reaction electrolytic bath 31a, $H_2O$ is oxidized by the oxidation catalyst layer 19 to generate $O_2$ and $H^+$. In the reduction reaction electrolytic bath 31b, $CO_2$ is reduced by the reduction catalyst layer 20 to generate CO and $H_2O$. These two electrolytic baths are separated from each other by the substrate 11 of the chemical reaction cell 30. In this example, an end of the substrate 11 is more projected than ends of the multi-junction solar cell 17, the oxidation catalyst layer 19, and the reduction catalyst layer 20, but the stacked structure is not limited thereto, and may be one in which the substrate 11, the multi-junction solar cell 17, the oxidation catalyst layer 19, and the reduction catalyst layer 20 have an identical area.

Separate electrolytic solutions are supplied to the oxidation reaction electrolytic bath 31a and the reduction reaction electrolytic bath 31b. The electrolytic bath flow path 41 that enables the ion transfer connects the oxidation reaction electrolytic bath 31a to the reduction reaction electrolytic bath 31b.

As described above, with the configuration provided with the electrolytic bath flow path 41, it is possible to transfer $H^+$ generated on the side of the oxidation catalyst layer 19 to the reduction catalyst layer 20, and $H^+$ enables decomposition of carbon dioxide on the side of the reduction catalyst layer 20. Thus, high photoreaction efficiency is achieved.

The electrolytic bath flow path 41 will be described in more details. The electrolytic bath flow path 41 is provided lateral to the electrolytic bath 31, for example. One end of the electrolytic bath flow path 41 is connected to the oxidation reaction electrolytic bath 31a, and the other is connected to the reduction reaction electrolytic bath 31b. In short, the electrolytic bath flow path 41 connects the oxidation reaction electrolytic bath 31a and the reduction reaction electrolytic bath 31b to each other. Thus, ions are enabled to transfer between the oxidation catalyst layer 19 and the reduction catalyst layer 20.

A part of the electrolytic bath flow path 41 is filled with an ion-exchange membrane 43 which allows only specific ions to pass therethrough. Thus, it is possible to allow transfer of the specific ions while separating the electrolytic solution between the oxidation reaction electrolytic bath 31a and the reduction reaction electrolytic bath 31b.

The ion-exchange membrane 43 is a proton exchange membrane and is capable of transfer $H^+$ generated in the oxidation reaction electrolytic bath 31a to the side of the reduction reaction electrolytic bath 31b. Examples of the proton exchange membrane include a cation-exchange membrane such as Nafion (Registered Trademark) and Flemion (Registered Trademark) and an anion-exchange membrane such as Neocepter (Registered Trademark) and Selemion (Registered Trademark).

A material capable of allowing ion transfer and separating the electrolytic solution, such as an agar, may be used in place of the ion-exchange membrane 43. For example, a salt bridge may be used. In general, with the use of a proton exchangeable solid polymer membrane, generally represented by Nafion (Registered Trademark), it is possible to attain a favorable ion transfer performance.

Further, the electrolytic bath flow path 41 may be provided with a circulation mechanism 42 such as a pump. By accelerating the circulation of the electrolytic solution by the circulation mechanism 42, it is possible to improve circulation of the ion ($H^+$) between the oxidation reaction electrolytic bath 31a and the reduction reaction electrolytic bath 31b. Also, two electrolytic bath flow paths 41 may be provided. By using the circulation mechanism 42 arranged on at least one of the two electrolytic bath flow paths 41, the ion may be transferred from the oxidation reaction electrolytic bath 31a to the reduction reaction electrolytic bath 31b through one of the flow paths 41, and the ion may be transferred from the reduction reaction electrolytic bath 31b to the oxidation reaction electrolytic bath 31a through the other one of the flow paths 41. Also, a plurality of the circulation mechanisms 42 may be provided. Further, a plurality (three or more) of the electrolytic bath flow paths 41 may be arranged in order to diminish ion diffusion and to more efficiently circulate the ion.

By forming the flow of the liquid by the circulation mechanism 42, it is possible to suppress remaining of bubbles of a generated gas on electrode surfaces and surfaces of the electrolytic baths and to suppress efficiency degradation and light intensity distribution attributable to scattered solar light caused by the bubbles.

Also, heat may be generated on the surface of the multi-junction solar cell 17 when irradiated with light. Convection may be generated by utilizing a temperature difference caused by the heat in the electrolytic solution, thereby more efficiently circulating the ion. In this case, it is possible to promote the ion transfer than the ion diffusion does.

A temperature adjustment mechanism 44 performing temperature adjustment of the electrolytic solution may be arranged on the electrolytic bath flow path 41 or the electrolytic bath 31. By performing the temperature control using the temperature adjustment mechanism 44, it is possible to control solar cell performance and catalyst performance. For example, by making the temperatures in the reaction system uniform, it is also possible to stabilize and improve the performances of the solar cells and the catalysts. By the temperature control, it is possible to change selectivity of the solar cells and the catalysts and to control the products thereof.

The oxidation reaction electrolytic bath 31a may be filled with an electrolytic solution containing an arbitrary electrolyte, which may preferably be an electrolytic solution that promotes the $H_2O$ oxidation reaction. Alternatively, the oxidation reaction electrolytic bath 31a may be filled with water. The oxidation catalyst layer 19 is immersed in the electrolytic solution. The reduction reaction electrolytic bath 31b is filled with the above-described electrolytic solution. The reduction catalyst layer 20 is immersed in the electrolytic solution. A temperature of the electrolytic solution with which the oxidation reaction electrolytic bath 31a is filled and a temperature of the electrolytic solution with which the reduction reaction electrolytic bath 31b is filled may be the same or different depending on the use environment.

Hereinafter, modification examples of the chemical reaction apparatus 61 will be described. FIG. 10 is a cross-sectional view showing a configuration of a chemical reaction apparatus 62 according to Modification Example 1. FIG. 11 is a cross-sectional view showing a configuration of a chemical reaction apparatus 63 according to Modification Example 2. Hereinafter, the configurations different from the above-described chemical reaction apparatus 61 will be descried.

As shown in FIG. 10, the chemical reaction apparatus 62 according to Modification Example 1 is provided with the chemical reaction cell 30, the electrolytic bath 31 in which the chemical reaction cell 30 is housed, and an opening 51 as an ion migration pathway formed in the substrate 11.

The opening 51 is arranged on such a manner as to penetrate through one end of the substrate 11 from the side of the oxidation reaction electrolytic bath 31a to the side of the reduction reaction electrolytic bath 31b. A part of the opening 51 is filled with the ion-exchange membrane 43, and the oxidation reaction electrolytic bath 31a and the reduction reaction electrolytic bath 31b are separated from each other by the substrate 11 and the ion-exchange membrane 43. The ion-exchange membrane 43 allows only specific ions to pass therethrough.

By the above-described configuration, it is possible to allow the specific ions to transfer through the ion-exchange membrane 43 while separating the electrolytic solution between the oxidation reaction electrolytic bath 31a and the reduction reaction electrolytic bath 31b.

As shown in FIG. 11, the chemical reaction apparatus 63 according to Modification Example 2 is provided with the chemical reaction cell 30, the electrolytic bath 31 in which the chemical reaction cell 30 is housed, and an opening 52 formed as an ion migration pathway. The opening 52 is arranged on such a manner as to penetrate through the reduction catalyst layer 20, the substrate 11, the multi-junction solar cell 17, and the oxidation catalyst layer 19 from the side of the oxidation reaction electrolytic bath 31a to the side of the reduction reaction electrolytic bath 31b.

A part of the opening 52 is filled with the ion-exchange membrane 43, and the oxidation reaction electrolytic bath 31a and the reduction reaction electrolytic bath 31b are separated from each other by the substrate 11 and the ion-exchange membrane 43. The ion-exchange membrane 43 allows only specific ions to pass there through.

By the above-described configuration, it is possible to allow the specific ions to transfer through the ion-exchange membrane 43 while separating the electrolytic solution between the oxidation reaction electrolytic bath 31a and the reduction reaction electrolytic bath 31b.

In the chemical reaction apparatus 63 according to Modification Example 2 in FIG. 11, the ion-exchange membrane 43 is disposed at only a part of the opening 52, but the ion-exchange membrane 43 may be disposed on a whole part of the opening 52.

[First Reduction Catalyst]

Hereinafter, the first reduction catalyst of the first and the second reduction catalysts to be used in the embodiments will be described in detail.

The first reduction catalyst is provided with a current collector having a metal layer on a surface thereof and a modifying organic molecule bonded to the surface of the metal layer and containing a quaternary nitrogen cation.

Hereinafter, with reference to FIGS. 12 to 14, the first reduction catalyst will be described. FIG. 12 is a schematic view showing a configuration of the first reduction catalyst. As shown in FIG. 12, the first reduction catalyst 1 is provided with a current collector 101 and a modifying organic molecule 112 containing a quaternary nitrogen cation. The current collector 101 has a metal layer 102 on a surface thereof. The modifying organic molecules 112 each containing the quaternary nitrogen cation are bonded to the metal layer 102 to form a self-assembled monolayer (SAM).

The current collector 101 is formed of a material having electroconductivity. As the current collector 101, a stainless steel substrate, for example, may be used.

The metal layer 102 on the surface of the current collector 101 contains at least one type of a metal selected from the group consisting of Au, Ag, Cu, Zn, Pt, Fe, Ti, Ni, Sn, In, and Bi. The metal layer 102 may contain a component other than the metal but may preferably consist of the metal. The metal layer 102 and the current collector 101 may be formed of an identical material. In such a case, the metal forming the metal layer 102 may serve also as the current collector 101.

The metal contained in the metal layer 102 functions as a catalyst for activating the reduction reaction. The metal to be contained in the metal layer 102 may preferably be in the form of particles since the catalyst activity is improved by the particle form.

An average particle size of the metal particles contained in the metal layer 102 may preferably be 1 nm or more and 300 nm or less. When the average particle size is 300 nm or less, it is possible to enhance catalyst activation efficiency. Also, metal particles having average particle size of less than 1 nm is difficult to produce. The average particle size of the metal particle of 150 nm or less is more preferred since such an average particle size further improves the catalyst activation efficiency. The metal particles may be primary particles having average particle size of 50 nm or less or may be secondary particles obtained by aggregating the primary particles.

The modifying organic molecule 112 containing quaternary nitrogen cation has a skeleton 110, a reactive functional group 109 positioned at the terminal on the side of the metal layer 102, and a terminal functional group 111 positioned at the terminal on the opposite side.

The reactive functional group 109 has affinity with the metal layer 102 and is chemically bonded to the metal layer 102. Thus, the modifying organic molecules 112 are immobilized on the metal layer 102. The reactive functional group 109 may preferably be a functional group capable of covalent bonding to the metal layer 102 and, for example, may preferably be selected from a thiol group, a disulfide group, and a thiocyanate group. The thiol group is more preferred since it has a superior bonding power.

The modifying organic molecule 112 containing quaternary nitrogen cation may form a salt with a counter anion. The counter anion may be, but not limited thereto, an anion such as a fluoride ion, a chloride ion, a bromide ion, an iodide ion, $SO_4^{2-}$, $HCO_3^-$, $BF_4^-$, $PF_6^-$, $CF_3COO^-$, $CF_3SO_3^-$, $NO_3^-$, $SCN^-$, $N(CN)_2^-$, $C(CN)_3^-(CF_3SO_2)_3C^-$, a bis(trifluoromethoxysulfonyl)imide anion, a bis(trifluoromethoxysulfonyl)imide anion, and bis(perfluoroethylsulfonyl)imide anion. In FIG. 12, the counter anion is omitted.

[First Aspect]

Hereinafter, a reduction catalyst 2 according to a first aspect of the first reduction catalyst will be described with reference to FIG. 13.

In the reduction catalyst 2 of the first aspect, the modifying organic molecule 112 is an organic molecule having a quaternary nitrogen cation as the terminal functional group 111. The quaternary nitrogen cation may preferably be an ammonium cation, an imidazole cation, a pyridinium cation, a piperidinium cation, or a pyrrolidinium cation. The quaternary nitrogen cation has a function of accelerating $CO_2$ reduction reaction by the metal layer 102 formed of metal particles. The quaternary nitrogen cation may preferably be an imidazole cation since it is excellent in activity improvement of $CO_2$ reduction.

In the reduction catalyst 2, the skeleton 110 of the modifying organic molecule 112 may be an alkyl chain. When a length of the alkyl chain is considerably long, involvement of the quaternary nitrogen cation in the $CO_2$ reduction reaction of the metal layer 102 is made difficult. Therefore, the alkyl chain length of the skeleton 110 may preferably be 2 to 16 carbon atoms.

Example of the modifying organic molecule 112 include the following molecules: 11-mercaptoundecane-1-trimethylammonium chloride, 1-(2-mercaptoethyl)-3-methylimidazolium bromide, 1-(3-mercaptopropyl)-3-methylimidazolium bromide, 1-(4-mercaptobutyl)-3-methylimidazolium bromide, 1-(5-mercaptopentyl)-3-methylimidazolium bromide, 1-(6-mercaptohexyl)-3-methylimidazolium bromide, 1-(8-mercaptooctyl)-3-methylimidazolium bromide, 1-(9-mercaptononyl)-3-methylimidazolium bromide, 1-(10-mercaptodecyl)-3-methylimidazolium bromide, 1-(11-mercaptoundecyl)-3-methylimidazolium bromide, 1-(12-mercaptododecyl)-3-methylimidazolium bromide, 1-(2-mercaptoethyl)-3-ethylimidazolium bromide, 1-(4-mercaptobutyl)-2,3-dimethylimidazolium bromide, 1-(2-mercaptoethyl)-4-methylpyridinium bromide, 1-(3-mercaptopropyl)-4-methylpyridinium bromide, 1-(4-mercaptobutyl)-4-methylpyridinium bromide, 1-(5-mercaptopentyl)-4-methylpyridinium bromide, 1-(6-mercaptohexyl)-4-methylpyridinium bromide, 1-(8-mercaptooctyl)-4-methylpyridinium bromide, 1-(9-mercaptononyl)-4-methylpyridinium bromide, 1-(10-mercaptodecyl)-4-methylpyridinium bromide, 1-(11-mercaptoundecyl)-4-methylpyridinium bromide, 1-(12-mercaptododecyl)-4-methylpyridinium bromide, 1-(4-mercaptobutyl) pyridinium bromide, 1-(2-mercaptoethyl)-1-methylpyrrolidinium bromide, 1-(3-mercaptopropyl)-1-methylpyrrolidinium bromide, 1-(4-mercaptobutyl)-1-methylpyrrolidinium bromide, 1-(5-mercaptopentyl)-1-methylpyrrolidinium bromide, 1-(6-mercaptohexyl)-1-methylpyrrolidinium bromide, 1-(8-mercaptooctyl)-1-methylpyrrolidinium bromide, 1-(9-mercaptononyl)-1-methylpyrrolidinium bromide, 1-(10-mercaptodecyl)-1-methylpyrrolidinium bromide, 1-(11-mercaptoundecyl)-1-methylpyrrolidinium bromide, 1-(12-mercaptododecyl)-1-methylpyrrolidinium bromide, 1-(2-mercaptoethyl)-1-methylpiperidinium bromide, 1-(3-mercaptopropyl)-1-methylpiperidinium bromide, 1-(4-mercaptobutyl)-1-methylpiperidinium bromide, 1-(5-mercaptopentyl)-1-methylpiperidinium bromide, 1-(6-mercaptohexyl)-1-methylpiperidinium bromide, 1-(8-mercaptooctyl)-1-methylpiperidinium bromide, 1-(9-mercaptononyl)-1-methylpiperidinium bromide, 1-(10-mercaptodecyl)-1-methylpiperidinium bromide, 1-(11-mercaptoundecyl)-1-methylpiperidinium bromide, and 1-(12-mercaptododecyl)-1-methylpiperidinium bromide.

[Second Aspect]

Hereinafter, a reduction catalyst 3 according to a second aspect of the first reduction catalyst will be described with reference to FIG. 14. In the reduction catalyst 3 of the second aspect, the modifying organic molecule 112 is an organic molecule having a quaternary nitrogen cation at a portion of the skeleton 110 and an amino group as the terminal functional group 111. The modifying organic molecule 112 is represented by any one of the following formulas I to V:

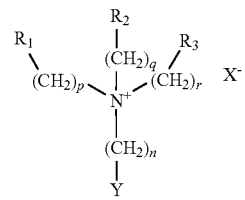

Formula I

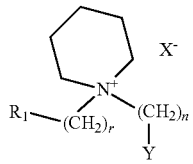

Formula II

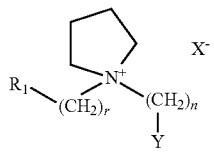

Formula III

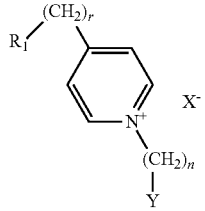

Formula IV

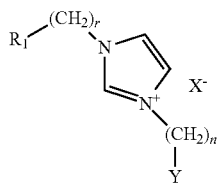

Formula V

In the formulas I to V, $R_1$ is a primary, secondary, or tertiary amino group; $R_2$ and $R_3$ may be the same or different and each independently is H or a primary, secondary, or tertiary amino group; each of p, q, r, and n independently is an integer of 1 or more and 12 or less; Y is a reactive functional group; and $X^-$ represents a counter anion.

In the reduction catalyst 3 of the second aspect, the quaternary nitrogen cation is at least one cation selected from an alkyl ammonium cation, a pyridinium cation, a piperidinium cation, a pyrrolidinium cation, and an imidazolium cation. The modifying organic molecule 112 forms a salt with the counter anion represented by $X^-$ in the formulas I to V. Specifically, the modifying organic molecule 112 forms an ammonium salt, a piperidinium salt, a pyrrolidinium salt, pyridinium salt, or an imidazolium salt. From the viewpoint of attaining a high reduction activity improvement effect as described later, it is more preferable that the quaternary nitrogen cation is the imidazolium cation and the modifying organic molecule 112 forms the imidazolium salt.

The skeleton 110 comprises the quaternary nitrogen cation and an alkyl group as a substituent group of the cation. The number of carbon atoms of the alkyl group corresponds to p, q, r, and n in the formulas I to V each of which independently is an integer of 1 or more and 12 or less. When each of p, q, r, and n is 1 or more and 12 or less in the formulas I to V, the quaternary nitrogen cation and the amino group as well as the quaternary nitrogen cation and the metal layer 102 are not too remote from each other, so that it is possible to attain the effect that the reduction efficiency is improved by the quaternary nitrogen cation. Each of p, q, r, and n may more preferably be an integer of 2 or more and 6 or less.

Figure 14:
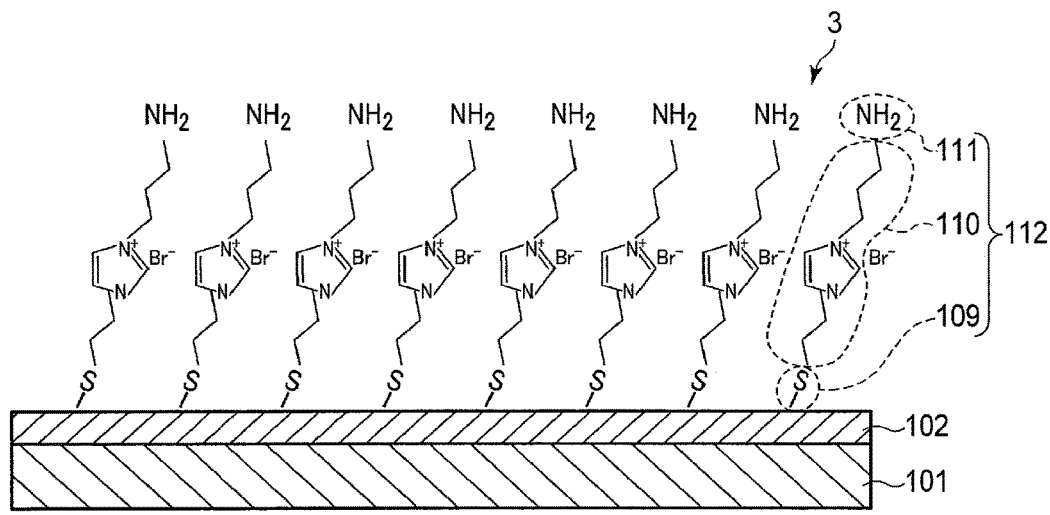
FIG. 14 is a schematic view showing one example of a configuration of a reduction catalyst according to a second aspect of the first reduction catalyst.

In FIG. 14, the bromide ion is depicted as the counter anion. Also, the reactive functional group 109 corresponds to Y in the formulas I to V.

In the reduction catalyst 3 of the second aspect, the terminal functional group 111 is an amino group and corresponds to $R_1$ and optionally $R_2$ and $R_3$ in the formulas I to V. The amino group may be a primary, secondary, or tertiary amino group. When the amino group is the secondary or tertiary amino group, a substituent group thereof may preferably be one or two $C_1$-$C_{12}$ alkyl group(s). When the number of carbon atoms of the alkyl group is 12 or less, the quaternary nitrogen cation and the amino group are not too remote from each other, and it is possible to attain the effect that the reduction efficiency is improved by the amino group as described later. The number of carbon atoms of the alkyl group may preferably be 2 or more and 6 or less. The amino group may form a salt with a hydrofluoric acid, hydrochloric acid, bromic acid, iodic acid, sulfuric acid, nitric acid, or phosphoric acid.

Examples of the modifying organic molecules 112 in the second aspect include the following molecules: 1-(2-mercaptoethyl)-3-aminomethylimidazolium bromide, 1-(3-mercaptopropyl)-3-aminomethylimidazolium bromide, 1-(4-mercaptobutyl)-3-aminomethylimidazolium bromide, 1-(5-mercaptopentyl)-3-aminomethylimidazolium bromide, 1-(6-mercaptohexyl)-3-aminomethylimidazolium bromide, 1-(8-mercaptooctyl)-3-aminomethylimidazolium bromide, 1-(9-mercaptononyl)-3-aminomethylimidazolium bromide, 1-(10-mercaptodecyl)-3-aminomethylimidazolium bromide, 1-(11-mercaptoundecyl)-3-aminomethylimidazolium bromide, 1-(12-mercaptododecyl)-3-aminomethylimidazolium bromide, 1-(2-mercaptoethyl)-3-(2-aminoethyl)imidazolium bromide, 1-(2-mercaptoethyl)-3-(3-aminopropyl)imidazolium bromide, 1-(2-mercaptoethyl)-3-(4-aminobutyl)imidazolium bromide, 1-(2-mercaptoethyl)-3-(5-aminopentyl)imidazolium bromide, 1-(2-mercaptoethyl)-3-(6-aminohexyl)imidazolium bromide, 1-(2-mercaptoethyl)-3-(8-aminooctyl)imidazolium bromide, 1-(2-mercaptoethyl)-3-(9-aminononyl)imidazolium bromide, 1-(2-mercaptoethyl)-3-(10-aminodecyl)imidazolium bromide, 1-(2-mercaptoethyl)-3-(11-aminoundecyl)imidazolium bromide, 1-(2-mercaptoethyl)-3-(12-aminododecyl)imidazolium bromide, 1-(4-mercaptobutyl)-3-(2-methylaminoethyl)imidazolium bromide, 1-(6-mercaptohexyl)-3-(3-dimethylaminopropyl)imidazolium bromide, 1-(8-mercaptohexyl)-3-(4-ethylaminobutyl)imidazolium bromide, 1-(2-mercaptoethyl)-4-aminomethylpyridinium bromide, 1-(3-mercaptopropyl)-4-aminomethylpyridinium bromide, 1-(4-mercaptobutyl)-4-aminomethylpyridinium bromide, 1-(5-mercaptopentyl)-4-aminomethylpyridinium bromide, 1-(6-mercaptohexyl)-4-aminomethylpyridinium bromide, 1-(8-mercaptooctyl)-4-aminomethylpyridinium bromide, 1-(9-mercaptononyl)-4-aminomethylpyridinium bromide, 1-(10-mercaptodecyl)-4-aminomethylpyridinium bromide, 1-(11-mercaptoundecyl)-4-aminomethylpyridinium bromide, 1-(12-mercaptododecyl)-4-aminomethylpyridinium bromide, 1-(2-mercaptoethyl)-4-(2-aminoethyl)pyridinium bromide, 1-(2-mercaptoethyl)-4-(3-aminopropyl)pyridinium bromide, 1-(2-mercaptoethyl)-4-(4-aminobutyl)pyridinium bromide, 1-(2-mercaptoethyl)-4-(5-aminopentyl)pyridinium bromide, 1-(2-mercaptoethyl)-4-(6-aminohexyl)pyridinium bromide, 1-(2-mercaptoethyl)-4-(8-aminooctyl)pyridinium bromide, 1-(2-mercaptoethyl)-4-(9-aminononyl)pyridinium bromide, 1-(2-mercaptoethyl)-4-(10-aminodecyl)pyridinium bromide, 1-(2-mercaptoethyl)-4-(11-aminoundecyl)pyridinium bromide, 1-(2-mercaptoethyl)-4-(12-aminododecyl)-pyridinium bromide, 1-(5-mercaptopentyl)-4-(3-methylaminopropyl)pyridinium bromide, 1-(9-mercaptononyl)-4-(4-dimethylaminobutyl)pyridinium bromide, 1-(11-mercaptoundecyl)-4-(6-ethylmethylaminohexyl)pyridinium bromide, 1-(2-mercaptoethyl)-1-aminomethylpyrrolidinium bromide, 1-(3-mercaptopropyl)-1-aminomethylpyrrolidinium bromide, 1-(4-mercaptobutyl)-1-aminomethylpyrrolidinium bromide, 1-(5-mercaptopentyl)-1-aminomethylpyrrolidinium bromide, 1-(6-mercaptohexyl)-1-aminomethylpyrrolidinium bromide, 1-(8-mercaptooctyl)-1-aminomethylpyrrolidinium bromide, 1-(9-mercaptononyl)-1-aminomethylpyrrolidinium bromide, 1-(10-mercaptodecyl)-1-aminomethylpyrrolidinium bromide, 1-(11-mercaptoundecyl)-1-aminomethylpyrrolidinium bromide, 1-(12-mercaptdodecyl)-1-aminomethylpyrrolidinium bromide, 1-(2-mercaptoethyl)-1-(2-aminoethyl)pyrrolidinium bromide, 1-(2-mercaptoethyl)-1-(3-aminopropyl)pyrrolidinium bromide, 1-(2-mercaptoethyl)-1-(4-aminobutyl)pyrrolidinium bromide, 1-(2-mercaptoethyl)-1-(6-aminohexyl)pyrrolidinium bromide, 1-(2-mercaptoethyl)-1-(8-aminooctyl)pyrrolidinium bromide, 1-(2-mercaptoethyl)-1-(9-aminononyl)pyrrolidinium bromide, 1-(2-mercaptoethyl)-1-(10-aminodecyl)-pyrrolidinium bromide, 1-(2-mercaptoethyl)-1-(11-aminoundecyl)pyrrolidinium bromide, 1-(2-mercaptoethyl)-1-(12-aminododecyl)pyrrolidinium bromide, 1-(2-mercaptoethyl)-1-(4-methylaminobutyl)pyrrolidinium bromide, 1-(3-mercaptopropyl)-1-(8-dimethylamino-octyl)pyrrolidinium bromide, 1-(4-mercaptobutyl)-1-(9-ethylmethylaminononyl)pyrrolidinium bromide, 1-(2-mercaptoethyl)-1-aminomethylpiperidinium bromide, 1-(3-mercaptopropyl)-1-aminomethylpiperidinium bromide, 1-(4-mercaptobutyl)-1-aminomethylpiperidinium bromide, 1-(5-mercaptopentyl)-1-aminomethylpiperidinium bromide, 1-(6-mercaptohexyl)-1-aminomethylpiperidinium bromide, 1-(8-mercaptooctyl)-1-aminomethylpiperidinium bromide, 1-(9-mercaptononyl)-1-aminomethylpiperidinium bromide, 1-(10-mercaptodecyl)-1-aminomethylpiperidinium bromide, 1-(11-mercaptoundecyl)-1-aminomethylpiperidinium bromide, 1-(12-mercaptododecyl)-1-aminomethylpiperidinium bromide, 1-(2-mercaptoethyl)-1-(2-aminoethyl)piperidinium bromide, 1-(2-mercaptoethyl)-1-(3-aminopropyl)-piperidinium bromide, 1-(2-mercaptoethyl)-1-(4-aminobutyl)piperidinium bromide, 1-(2-mercaptoethyl)-1-(6-aminohexyl)piperidinium bromide, 1-(2-mercaptoethyl)-1-(8-aminooctyl)piperidinium bromide, 1-(2-mercaptoethyl)-1-(9-aminononyl)-piperidinium bromide, 1-(2-mercaptoethyl)-1-(10-aminodecyl)piperidinium bromide, 1-(2-mercaptoethyl)-1-(11-aminoundecyl)piperidinium bromide, 1-(2-mercaptoethyl)-1-(12-aminododecyl)piperidinium bromide, 1-(10-mercaptodecyl)-1-(9-methylaminononyl)piperidinium bromide, 1-(11-mercaptoundecyl)-1-(10-dimethylamino-decyl)piperidinium bromide, 1-(12-mercaptododecyl)-1-(12-ethylmethylaminododecyl)piperidinium bromide, 2-mercaptoethyl-(aminomethyl)dimethylammonium bromide, 3-mercaptopropyl-(aminomethyl)dimethylammonium bromide, 4-mercaptobutyl-(aminomethyl)dimethylammonium bromide, 5-mercaptopentyl-(aminomethyl)dimethylammonium bromide, 6-mercaptohexyl-(aminomethyl)dimethylammonium bromide, 8-mercaptooctyl-(aminomethyl)dimethylammonium bromide, 9-mercaptononyl-(aminomethyl)dimethylammonium bromide, 10-mercaptodecyl-(aminomethyl)dimethylammonium bromide, 11-mercaptoundecyl-(aminomethyl)dimethylammonium bromide, 12-mercaptododecyl-(aminomethyl)-dimethylammonium bromide, 2-mercaptoethyl-(3-aminopropyl)dimethylammonium bromide, 2-mercaptoethyl-(4-aminobutyl)dimethylammonium bromide, 2-mercaptoethyl-(5-aminopentyl)dimethylammonium bromide, 2-mercaptoethyl-(6-aminohexyl)dimethylammonium bromide, 2-mercaptoethyl-(8-aminooctyl)dimethylammonium bromide, 2-mercaptoethyl-(9-aminononyl)dimethylammonium bromide, 2-mercaptoethyl-(10-aminodecyl)dimethylammonium bromide, 2-mercaptoethyl-(11-aminoundecyl)-dimethylammonium bromide, 2-mercaptoethyl-(12-aminododecyl)dimethylammonium bromide, 5-mercaptopentyl-(8-methylaminononyl)ethylammonium bromide, 6-mercaptohexyl-(6-dimethylaminohexyl)-methylammonium bromide, and 8-mercaptooctyl-(4-ethylmethylaminobutyl)butylhexylammonium bromide.

[Reduction Reaction at the First Reduction Catalyst]

The reduction reaction at the first reduction catalyst will be described by taking $CO_2$ reduction as an example. In an elementary reaction of the $CO_2$ reduction reaction, $CO_2$ becomes a $CO_2$ radical anion by one-electron reduction reaction. A high overvoltage is required for the reaction. The overvoltage is a loss of energy and is the cause of degradation of energy conversion efficiency. Also, reduction reactions of water and a hydrogen ion to generate hydrogen occur as side reactions simultaneously with the $CO_2$ reduction reaction. By the side reactions, the Faraday efficiency of the $CO_2$ reduction reaction is degraded. However, the above-described first reduction catalyst has high reduction efficiency.

In the first reduction catalyst, the quaternary nitrogen cation forms a reaction intermediate with $CO_2$. Therefore, the quaternary nitrogen cation contributes to generation and stabilization of a $CO_2$ radical anion. Accordingly, the first reduction catalyst is capable of causing the $CO_2$ reduction reaction with low energy. As a result, the energy conversion efficiency of the first reduction catalyst is improved. Also, the quaternary nitrogen cation has the effect of inhibiting the water and the hydrogen ion from approaching the metal layer 102. Therefore, the quaternary nitrogen cation imparts reaction selectivity to the reduction reaction at the metal layer 102. In short, it is possible to suppress generation of hydrogen caused by the side reaction and to improve the Faraday efficiency.

Since the first reduction catalyst has the high reduction efficiency, it is possible to provide a reduction product producing system capable of recovering the reduction products with high efficiency.

Further, the reduction catalyst 3 of the second aspect is capable of attaining higher reduction efficiency. The higher reduction efficiency is attained because the amino group in each of the modifying organic molecules 112 reacts with a $CO_2$ molecule to form a carbonate, thereby attracting the $CO_2$ molecules required for the reduction reaction and enabling to supply the $CO_2$ molecules to the quaternary nitrogen cations and the metal layer 102. Also, the amino group forms a salt with carboxylic acids such as formic acid, acetic acid, and oxalic acid generated by the $CO_2$ reduction. Therefore, the reduction catalyst 3 has the effect of promoting a multi-electron reduction reaction in which reduction occurs continuously. As a result, it is possible to further improve the reduction efficiency. Therefore, it is possible to provide a reduction product producing system capable of recovering the reduction products with higher efficiency.

The reduction catalyst 3 of the second aspect is capable of generating ethylene glycol with high selectivity. Therefore, with the use of the reduction catalyst 3, it is possible to provide a reduction product producing system that produces ethylene glycol with high selectivity.

The reduction products may vary depending on an interaction among the quaternary nitrogen cation, the metal layer 102, and the raw material to be reduced. Details thereof are described below.

A reduction potential is applied to the metal layer 102 of the reduction catalyst. Therefore, an ion containing particularly $CO_2$ such as a hydrogen carbonate ion among the electrolytic solution components or physically dissolved $CO_2$ receives electrostatic attractive force in the vicinity of the quaternary nitrogen cation contained in the modifying organic molecule 112 immobilized on the metal layer 102 and the surface of the metal layer 102. As a result, $CO_2$, the metal layer 102, and the quaternary nitrogen cation form an electric double layer at the interface between the catalyst and the electrolytic solution.

At the interface, the $CO_2$ reduction reaction based on a charge transfer reaction proceeds. In the reduction reaction electrolytic bath 31b, $CO_2$ is reduced by the reduction catalyst layer 20 to generate carbon compounds. Mores pacifically, $CO_2$ is converted into carbon monoxide (CO), formic acid (HCOOH), formaldehyde (HCHO), methanol ($CH_3OH$), acetic acid ($CH_3COOH$), acetaldehyde ($CH_3CHO$), ethanol ($CH_3CH_2OH$), and ethylene glycol ($HOCH_2CH_2OH$). Also, hydrogen ($H_2$) can be produced by reduction of water ($H_2O$) as a side reaction.

When a two-electron reduction reaction of carbon dioxide occurs, formic acid is generated in addition to carbon monoxide. Formaldehyde is generated by a two-electron reduction reaction of formic acid. Further, methanol is generated by a two-electron reduction reaction of formaldehyde. When generating methanol by using the first reduction catalyst 1, formic acid or formaldehyde may be selected as the raw material to be reduced in addition to carbon dioxide. Therefore, it is desirable that at least one raw material to be reduced selected from carbon dioxide, formic acid, and formaldehyde is absorbed by the electrolytic solution in the reduction reaction electrolytic bath 31b. Examples of the electrolytic solution in the reduction reaction electrolytic bath 31b include a sodium hydrogen carbonate solution.

Also, oxalic acid can be generated in some cases by the two-electron reduction reaction of carbon dioxide. Glycolic acid is generated by a two-electron reduction reaction of oxalic acid. Further, glyoxal or glycolic acid is generated by a two-electron reduction reaction of glycolic acid. Yet further, glycol aldehyde is generated by a two-electron reduction reaction of glyoxal or glycolic acid. Furthermore, ethylene glycol is generated by a two-electron reduction reaction of glycol aldehyde. When generating ethylene glycol by using the first reduction catalyst 1, oxalic acid, glycolic acid, or glycol aldehyde may be selected as the raw material to be reduced in addition to carbon dioxide. Therefore, at least one raw material to be reduced selected from oxalic acid, glycolic acid, or glycol aldehyde may be absorbed by the electrolytic solution in the reduction reaction electrolytic bath 31b.

When an eight-electron reduction reaction of carbon dioxide occurs, acetic acid can be generated in some cases. Acetaldehyde is generated by a two-electron reduction reaction of acetic acid. Further, ethanol is generated by a two-electron reduction reaction of acetaldehyde. When generating ethanol by using the first reduction catalyst 1, acetic acid or acetaldehyde may be selected as the raw material to be reduced in addition to the carbon dioxide. Therefore, at least one reduction material selected from carbon dioxide, acetic acid, and acetaldehyde may be absorbed by the electrolytic solution in the reduction reaction electrolytic bath 31b.

As described above, the reaction by which formic acid, formaldehyde, and methanol are generated through the reduction of carbon dioxide, the reaction by which oxalic acid, glycolic acid, and glyoxal or glycolic acid, glycol aldehyde, and ethylene glycol are generated through the reduction of carbon dioxide, and the reaction by which acetic acid, acetaldehyde, and ethanol are generated through the reduction of carbon dioxide depend on a density of the modifying organic molecules 112 in the first reduction catalyst 1. For example, when the density of the modifying organic molecules 112 on the metal layer 102 is $1 \times 10^{11}$ atoms/cm$^2$ or less, the reaction by which formic acid, formaldehyde, and methanol are mainly generated occurs. On the other hand, when the density of the modifying organic molecules 112 on the metal layer 102 is $1 \times 10^{12}$ to $1 \times 10^{15}$ atoms/cm$^2$, the reaction by which acetic acid, acetaldehyde, and ethanol are generated in addition to formic acid, formaldehyde, and methanol occurs. In particular, when the density of the modifying organic molecules 112 on the metal layer 102 is $1 \times 10^{13}$ to $1 \times 10^{15}$ atoms/cm$^2$, the reaction by which acetic acid, acetaldehyde, and ethanol are mainly generated occurs.

The bonding state and the molecular density of the modifying organic molecules 112 may be calculated based on an analysis result by X-ray photoelectron spectroscopy (XPS). The analysis conditions may be those described below. A detection angle means an angle formed by a normal line of a sample and an input lens axis of a detector.

Type of Machine Used: Quantera-SXM produced by PHI
X-Ray Irradiation Source: Single-Crystal Spectroscopic AlKα Beam
Output: 50 W
Analysis Region: Φ200 μm
Pass Energy: Wide Scan=280.0 eV (1.0 eV/Step)
Narrow Scan=69.0 eV (0.125 eV/Step)
Detection Angle: 45°
Charged Neutralization Electron Gun: Both of Ar$^+$ and e$^-$ As correction of charging (horizontal axis energy correction), the C—C/H bonding component in the C1s spectrum is adjusted to 284.80 eV.

The bonding density (molecular density) of the modifying organic molecules 112 is calculated by the following formula (6) from the number of Au atoms per unit area estimated by the following formula (5) and the number of S atoms (S/Au) normalized by using the number of Au atoms of a semi-quantitative analysis result.

$$\text{Au (atoms/cm}^2\text{)} = \text{density (g/cm}^3\text{)} \times \text{detection depth (nm)} \times N/Mw \quad (5), \text{ and}$$

$$\text{Molecular density (atoms/cm}^2\text{)} = \text{Au (atoms/cm}^2\text{)} \times \text{S/Au (ratio between numbers of atoms)} \quad (6),$$

where the density is 19.3 g/cm$^3$, the detection depth is 5 nm, N is an Avogadro number (atoms/mol), and Mw is 197 g/mol.

In the first reduction catalyst 1, the reaction by which carbon dioxide is reduced and ethylene glycol is generated through oxalic acid, glycolic acid, or glycol aldehyde selectively occurs when the electrodes are maintained to the reduction potentials. In short, since the electrodes are maintained to the reduction potentials, orientations of the modifying organic molecules 112 are uniformly aligned, and the reaction by which ethylene glycol is generated occurs. As the electrolysis conditions for maintaining the electrodes to the reduction potentials, a potential of −0.8 V to −1.3 V is applied to a working electrode for 5 hours or more, more preferably 3 hours or more, further preferably 1 hour or more in a three-electrode cell using an electrode substrate as the working electrode, an Ag—AgCl electrode as a reference electrode, and a Pt electrode as a counter electrode. Orientation of the modifying organic molecules 112 may be observed by using a scanning tunneling microscope (STM).

[Method of Producing the First Reduction Catalyst]

Hereinafter, a method of producing the first reduction catalyst will be described.

To start with, the metal layer 102 is formed on the surface of the current collector 101. As a method for the formation, a known vacuum deposition method such as sputtering, vapor deposition, and ALD (atomic layer deposition) may be employed.

Next, by bonding the reactive functional group 109 to the metal layer 102, the modifying organic molecules 112 are immobilized on the metal layer 102. As a method for the immobilization, a known method may be employed. For example, a method of bringing the current collector 101 provided with the metal layer 102 into contact with a solution in which the modifying organic molecules 112 are dissolved, a method of depositing the modifying organic molecules 112 on the current collector 101 by evaporating the modifying organic molecules 112 in high vacuum, a method of spraying the modifying organic molecules 112 onto the surface of the current collector 101 using a spray and the like are employable.

In the method of using the solution in which the modifying organic molecules 112 are dissolved, the modifying organic molecules 112 chemisorbed onto the metal layer 102 spontaneously form an aggregate by the Van der Waal's force and a hydrophobic interaction between absorbed molecules. Then, by dense aggregation of the absorbed molecules, a monolayer having aligned orientations is formed.

As a solvent for dissolving the modifying organic molecules 112, an arbitrary solvent capable of dissolving the organic molecules may be used. For example, it is possible to select from an alcohol such as ethanol and an aromatic or aliphatic organic solvent such as toluene and hexane. It is preferable to use ethanol since the modifying organic molecules 112 have high solubility into ethanol, and since ethanol is easy to handle.

One example of immobilizing the modifying organic molecules 112 on the metal layer 102 will be described in more details.

To start with, a solution in which the modifying organic molecules 112 are dissolved is prepared. Next, the current collector 101 on which the metal layer 102 is formed is immersed into the prepared solution. An immersion time is from a several minutes to a several hours. Thus, the modifying organic molecules 112 are immobilized on the surface of the metal layer 102. Conditions such as a concentration of the modifying organic molecules 112, the immersion time, and an immersion temperature may appropriately be changed depending on the structure and the like of the modifying organic molecules 112. These conditions influence on a state of formation of the monolayer of the modifying organic molecules 112.

It takes time to form the monolayer when the concentration of the prepared solution is too low. On the other hand, excessive molecules are absorbed on the monolayer when the concentration is too high, thereby raising a risk of formation of a layered film. Therefore, the concentration of the modifying organic molecules 112 may preferably be 0.1 mM or more and 100 mM or less, more preferably 1 mM or more and 10 mM or less.

The immersion time may preferably be sufficient for forming the dense monolayer having aligned orientations. The immersion time may preferably be one minute or more and 100 hours or less, and 12 hours or more and 72 hours or less.

The temperature of the prepared solution during the immersion influences on the formation of the dense monolayer having aligned orientation. Therefore, the temperature may desirably be a room temperature (25° C.) or more to 60° C. or less in view of a vapor pressure and a boiling point of the solvent.

It is possible to identify whether or not the modifying organic molecules 112 are immobilized on the surface of the metal layer 102 by employing a known electrochemical method or a surface analysis method.

As the electrochemical method, a cyclic voltammetry may be employed. Hereinafter, a specific example thereof will be described. To start with, a 0.2 M potassium chloride (KCl) aqueous solution in which 1 mM potassium hexacyanoferrate (III) ($K_3[Fe(CN)_6]$) or 1 mM hexaamine ruthenium (III) chloride ($[Ru(NH_3)_6]Cl_3$) is dissolved is prepared. Electrochemical responses of the current collector 101 in the aqueous solution before and after the step of allowing the modifying organic molecules 112 to be absorbed are measured to compare the results.

As the electrochemical responses, reaction currents by electrochemical redox reactions of a hexacyanoferrate (III) anion or a hexaamine ruthenium (III) cation are measured. The reaction current for the current collector 101 on which the modifying organic molecules 112 are immobilized is decreased as compared to the reaction current for the current collector 101 on which the modifying organic molecules 112 are not immobilized. Such phenomenon occurs because the redox reactions of the hexacyanoferrate (III) anion or the hexaamine ruthenium (III) cation are inhibited due to the immobilization of the modifying organic molecules 112 on the metal layer 102. By measuring the above-described reaction currents, it is possible to indirectly identify the immobilization of the modifying organic molecules 112.

As the surface analysis method, a Fourier transform infrared spectrophotometer (FT-IR) employing a reflection method may be used. With the method, it is possible to highly sensitively measure infrared spectrums of a thin film and a molecular adsorbate on the surface of the current collector 101. In short, it is possible to acquire information about a structure of the organic molecule, particularly about the functional group. Also, X-ray photoelectron spectroscopy (XPS) may be employed as the surface analysis method. With the method, when the modifying organic molecules 112 are provided and the modifying organic molecule 112 is provided with an anion, it is possible to measure a composition of the anion. Also, it is possible to determine presence or absence of the modifying organic molecules 112 based on a difference in water wettability by using a contact angle meter.

[Second Reduction Catalyst]

Hereinafter, the second reduction catalyst of the first and second reduction catalysts usable in the embodiment will be described in detail.

The second reduction catalyst is provided with a current collector having a surface layer, a spacer organic molecule layer formed on the surface layer, and metal particles bonded to a surface of the spacer organic molecule layer.

Hereinafter, the second reduction catalyst will be described with reference to FIGS. 15 to 18. In the drawings, members that are identical to the first reduction catalyst are denoted by the identical reference numerals. Also, duplicated description will be given as required.

Figure 15:
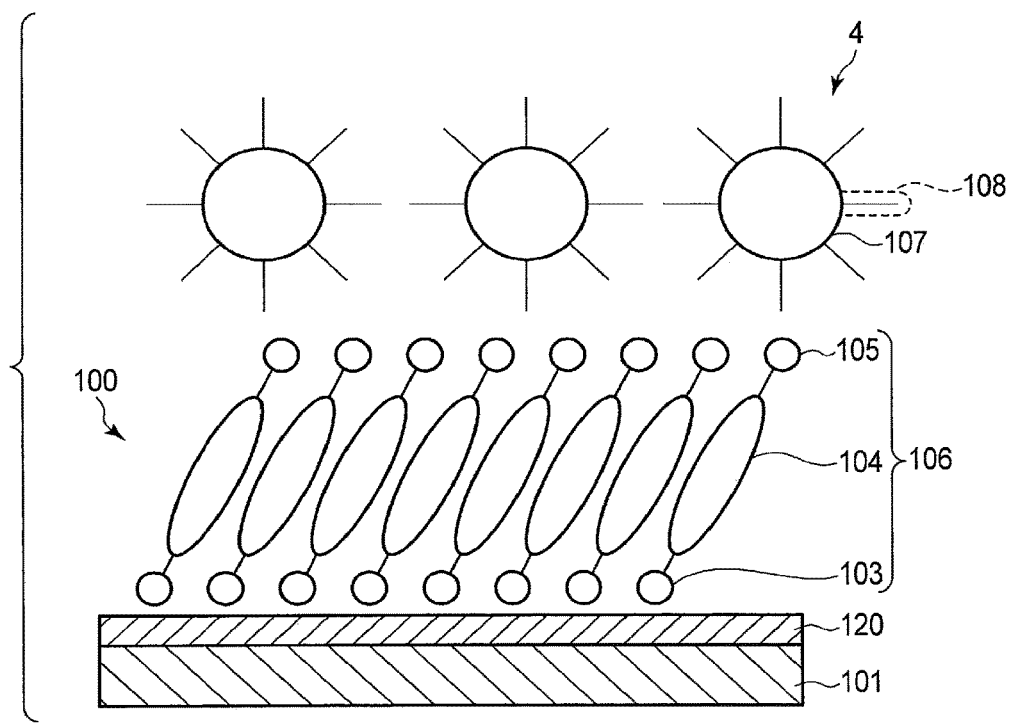
FIG. 15 is a schematic view showing a configuration of a reduction catalyst according to a second reduction catalyst.

FIG. 15 is a schematic view showing a configuration of a second reduction catalyst 4. As shown in FIG. 15, the second reduction catalyst 4 is provided with a current collector 101, a spacer organic molecule layer 100, and metal particles 107. The current collector 101 has a surface layer 120 on a surface thereof. Same as the first reduction catalyst, the current collector 101 is formed of a material having electroconductivity. As the current collector 101, a stainless steel substrate may be used, for example.

The surface layer 120 on the surface of the current collector 101 is a metal layer or an oxide layer. When the surface layer 120 is a metal layer, the surface layer 120 comprises at least one type of a metal selected from the group consisting of Au, Ag, Cu, Zn, Pt, Fe, Ti, Ni, Sn, In, and Bi. The metal layer 102 may contain a component other than the metal but may preferably be consisting of the metal. The metal layer 102 and current collector 101 may be formed of an identical material. In such a case, the metal forming the metal layer 102 may serve also as the current collector 101.

When the surface layer 120 of the current collector 101 is an oxide layer, the surface layer 120 comprises at least one type of oxide selected from the group consisting of titanium oxide ($TiO_2$), zirconium oxide ($ZrO_2$), aluminum oxide ($Al_2O_3$), silicon oxide ($SiO_2$), zinc oxide (ZnO), tin-doped indium oxide (ITO), and fluorine-doped tin oxide (FTO). Alternatively, the surface layer 120 may be an oxide coating layer formed on a surface of the stainless steel substrate. Except for the transparent electroconductive film such as ITO and FTO, the oxide layer typically is an insulator. In order to ensure electroconductivity by a tunneling current, a film thickness of the oxide layer is 10 nm or less, more preferably 5 nm or less.

The spacer organic molecule layer 100 is a monolayer (self-assembled monolayer) formed by chemisorption of the spacer organic molecules 106 by the surface of the surface layer 120 and self-assembly. The spacer organic molecules 106 have a function of fixing and electrically connecting the metal particles 107 to the current collector 101.

The spacer organic molecule 106 has a skeleton 104 and a first reactive functional group 103 and a second reactive functional group 105 bonded to terminals of the skeleton 104.

Along with an increase in chain length of the spacer organic molecule 106, the molecule layer is increased in density and uniformity of orientations on the surface layer 120. Therefore, by extending the chain length, it is possible to facilitate immobilization of the metal particles 107 and to form the molecule layer having high durability. On the other hand, when the chain length is too long, resistance for the tunneling current on the spacer organic molecule layer 100 is increased to increase an electrode resistance of the second reduction catalyst 4. Therefore, a total number of carbon atoms to be contained in the spacer organic molecules 106 may preferably be within the range of 2 to 12, more preferably 2 to 6.

The first reactive functional group 103 has affinity with the surface layer 120 and chemically reacts with the surface layer 120 to be bonded thereto. Thus, the spacer organic molecules 106 are immobilized on the surface layer 120. The first reactive functional group 103 may preferably be a functional group capable of covalent bonding to the surface layer 120. When the surface layer 120 is formed of the first metal layer, the reactive functional group 103 may preferably be selected from a thiol group, a disulfide group, and a thiocyanate group. The thiol group is more preferred since it has a superior bonding power. When the surface layer 120 is formed of the oxide layer or the oxide coating film on the stainless steel substrate, the first reactive functional group 103 may preferably be selected from a carboxylic acid group, a phosphonic acid group, a phosphoric acid ester group, and an alkoxy silyl group. The phosphonic acid group is more preferred since it has a superior bonding power.

The second reactive functional group 105 has affinity with the metal particles 107 and is chemically bonded thereto. Thus, the metal particles 107 are immobilized on the spacer organic molecule layer 100. The second reactive functional group 105 may preferably be a functional group capable of electrostatic bonding to the charged metal particles 107 and may preferably be selected from an amino group and a carboxyl group. Alternatively, the second reactive functional group 105 may preferably be a functional group capable of covalent bonding to metal particles 107 and may preferably be selected from functional groups including a thiol group, a disulfide group, and a thiocyanate group. The thiol group is more preferred since it has a superior bonding power.

Examples of the spacer organic molecules 106 include molecules same as those of the examples of the modifying organic molecules 112 in the first aspect of the first reduction catalyst.

The metal particles 107 function as a catalyst that activates the reduction reaction. As a material for the metal particles, at least one element selected from the group consisting of Au, Ag, Cu, Pt, Zn, Fe, Ti, Sn, In, Bi, and Ni is used. It is preferable to use the metal particles comprising Au or Ag as the metal particles 107 since such metal particles have especially high catalyst activity.

An average particle size of the metal particles 107 may preferably be 1 nm or more and 300 nm or less. When the average particle size is less than 300 nm, it is possible to raise catalyst activation efficiency. Also, the metal particles 107 having average particle size of 1 nm or less are difficult to produce. The average particle size of the metal particles 107 of 150 nm or less is more preferred since such an average particle size further improves the catalyst activation efficiency. The metal particles 107 may be primary particles having average particle size of 50 nm or less or may be secondary particles obtained by aggregating the primary particles.

It is possible to measure the average particle size of the metal particles 107 by particle size distribution measurement employing dynamic light scattering. Specifically, a solution into which the metal particles 107 are dispersed is irradiated with a laser beam, and a fluctuation of scattering light reflecting a diffusion coefficient is detected. From the result, it is possible to calculate a particle size using the Stokes-Einstein equation. In a frequency distribution in which appearance ratios of respective particle sizes are determined, the largest particle size or the maximum value of the distribution is a mode diameter to be regarded as the average particle size.

The metal particles are provided with organic molecules 108, a part of each of the surfaces of the organic molecules 108 having a charge. Thus, the surfaces of the metal particles 107 are electrically charged. Due to an electrostatic attractive force (electrostatic bonding) between the charges of the surfaces of the metal particles 107 and the charges of the second reactive functional group 105, the metal particles 107 are immobilized on the surface of the spacer organic molecule layer 100. The charge of the organic molecules 108 may be either one of a positive charge or a negative charge.

When the charge of the organic molecules 108 is the negative charge, the surfaces of the metal particles 107 also have the negative charge. In this case, by using the spacer organic molecules 106 each having the amino group as the second reactive functional group 105, it is possible to immobilize the metal particles 107.

On the other hand, when the charge of the organic molecules 108 is the positive charge, it is possible to immobilize the metal particles 107 by using the spacer organic molecules 106 each having the carboxyl group as the second reactive functional group 105.

Since electrostatic repulsion occurs between particles when the metal particles 107 have charges, it is also possible to prevent coarsening that may otherwise be caused by aggregation of nanoparticle-sized particles.

The charge on the surface of each of the metal particles 107 is capable of imparting a charge produced by the organic molecules 108 and caused by the production method of the metal particles 107 or a charge produced by the organic molecules 108 and caused by a treatment after the production. For example, when a reducing agent such as a citric acid is used for precipitating the metal particles 107 from a liquid phase by reduction, the citric acid is applied to the surfaces of the metal particles 107, so that the surfaces of the metal particles 107 are negatively charged. By electrostatically bonding molecules having amino group to the surfaces of the negatively charged metal particles 107, the surfaces of the metal particles 107 are positively charged. On the other hand, by reacting amine molecules each having a reactive group such as thiol capable of covalent bonding with the surfaces of the metal particles 107, the surfaces of the metal particles 107 are positively charged. In short, the amine molecules each having a reactive group such as thiol capable of covalent bonding is usable irrespective of the presence or absence of the charge on the surface of each of the metal particles 107 and of whether the charge is positive or negative.

[Modification Example 1]

Modification Example 1 of the second reduction catalyst will be described with reference to FIGS. 16 and 17.

Figure 16:
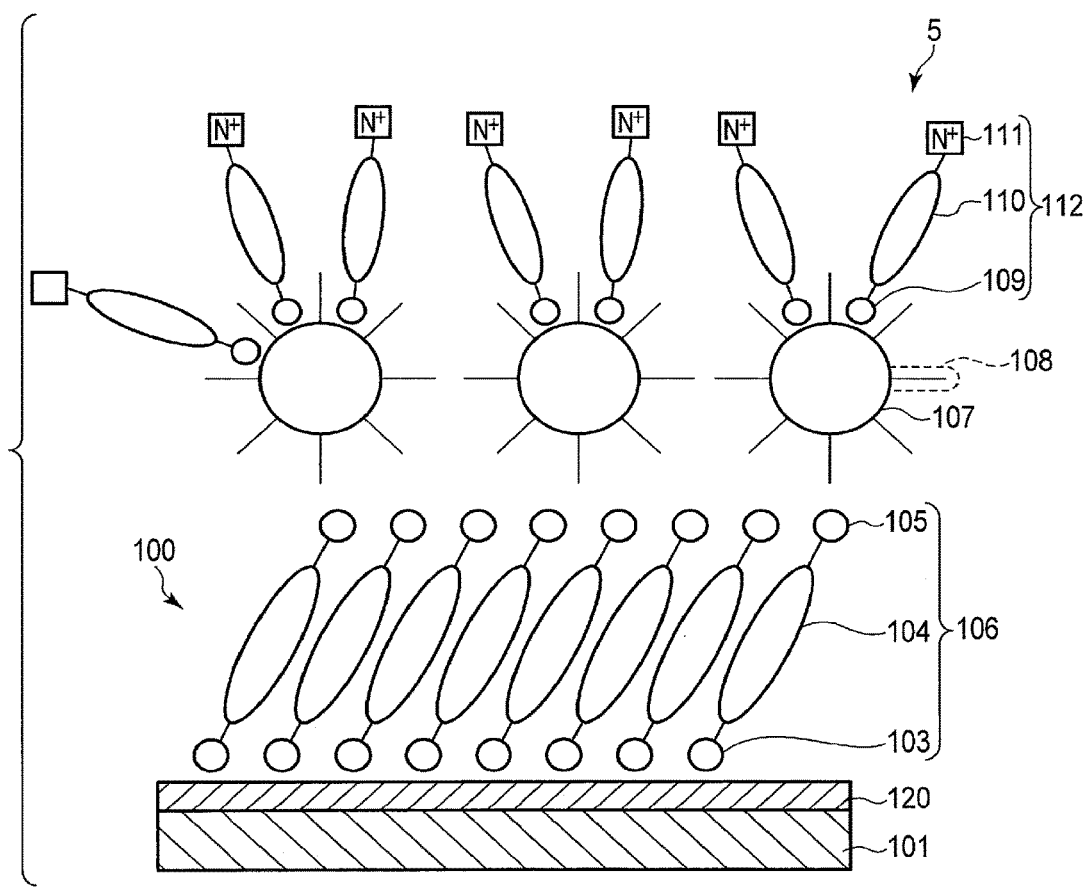
FIG. 16 is a schematic view showing a configuration of a reduction catalyst according to Modification Example 1 of the second reduction catalyst.
Figure 17:
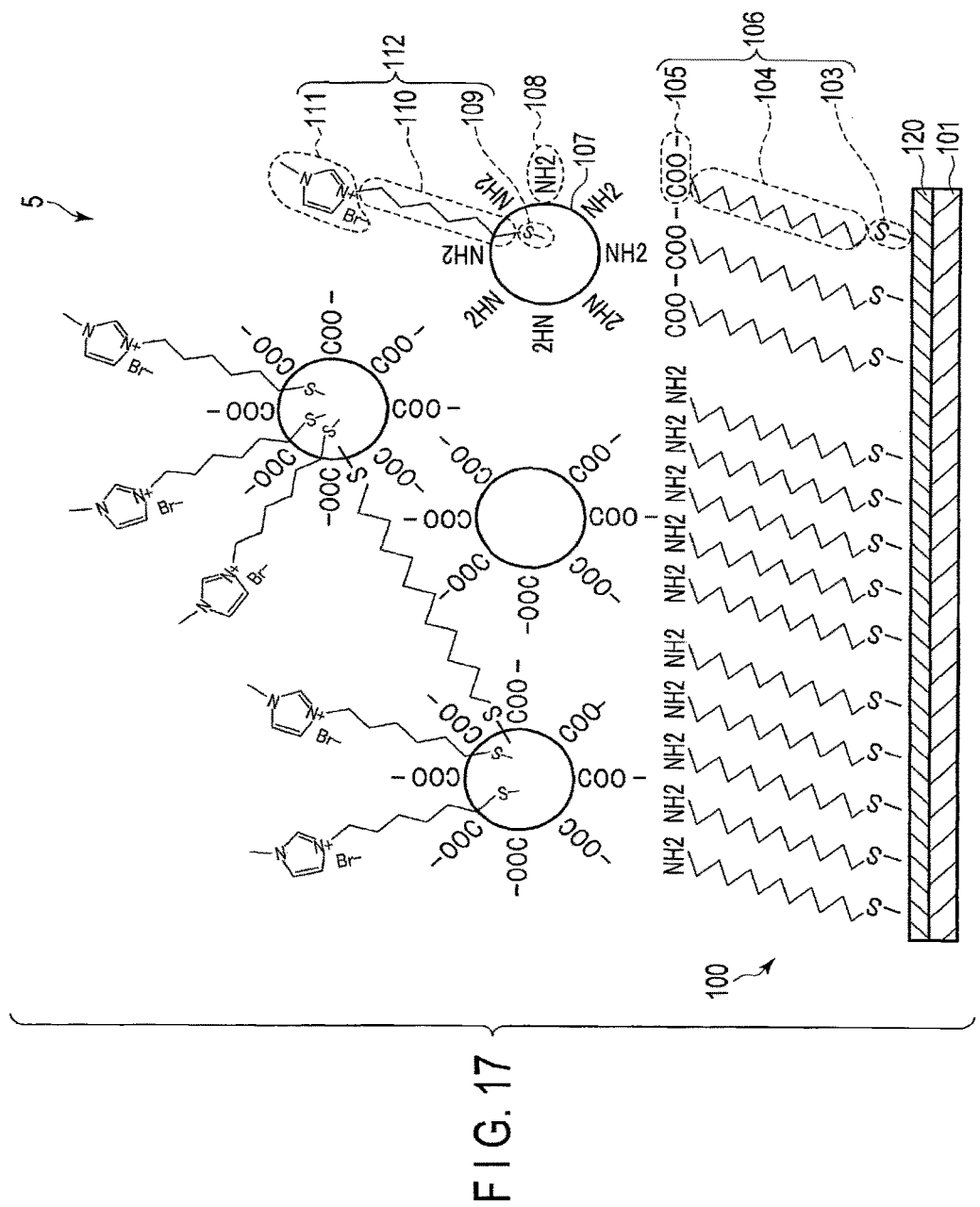
FIG. 17 is a schematic view showing one example of a configuration of a reduction catalyst according to Modification Example 1 of a second aspect.

FIG. 16 is a schematic view showing a configuration of a second reduction catalyst 5 according to Modification Example 1. FIG. 17 is a schematic view showing in detail one example of the configuration of the second reduction catalyst 5 according to Modification Example 1.

As shown in FIG. 16, the second reduction catalyst 5 is provided with a current collector 101 having a surface layer 120, a spacer organic molecule layer 100 formed on a surface of the surface layer 120, metal particles 107 bonded to a surface of the spacer organic molecule layer 100, and modifying organic molecules 112 bonded to the metal particles 107 and each containing a quaternary nitrogen cation.

The current collector 101, the surface layer 120, the spacer organic molecules 106, and the metal particles 107 may be the same as those of the above-described second reduction catalyst 4. Also, the modifying organic molecules 112 may be the same as those of the reduction catalyst according to the first aspect of the first reduction catalyst. In short, in Modification Example 1, the modifying organic molecules 112 are organic molecules each having the quaternary nitrogen cation as a terminal functional group 111.

The reactive functional group 109 of the modifying organic molecules 112 has affinity with the metal particles 107 and is chemically bonded to the metal particles 107. Thus, the modifying organic molecules 112 are immobilized on the metal particles 107. The modifying organic molecules 112 have functions of being bonded to the metal particles 107 and accelerating a $CO_2$ reduction reaction occurring on the metal particles 107.

Examples of the modifying organic molecules 112 to be used in Modification Example 1 include molecules same as those of the examples of the modifying organic molecules 112 in the first aspect of the first reduction catalyst.

The modifying organic molecule 112 containing the quaternary nitrogen cation may form a salt with a counter anion. The counter anion may be, but not limited thereto, an anion such as a fluoride ion, a chloride ion, a bromide ion, an iodide ion, $SO_4^{2-}$, $HCO_3^-$, $BF_4^-$, $PF_6^-$, $CF_3COO^-$, $CF_3SO_3^-$, $NO_3^-$, $SCN^-$, $N(CN)_2^-$, $C(CN)_3^-(CF_3SO_2)_3^-$, a bis(trifluoromethoxysulfonyl)imide anion, a bis(trifluoromethoxysulfonyl)imide anion, and bis(perfluoroethylsulfonyl)imide anion. In FIGS. 15 and 16, the counter anion is omitted.

[Modification Example 2]

Modification Example 2 of the second reduction catalyst will be described with reference to FIG. 18.

FIG. 18 is a schematic view showing one example of a configuration of a second reduction catalyst 6 according to Modification Example 2.

As shown in FIG. 18, the second reduction catalyst 6 is provided with a current collector 101 having a surface layer 120, a spacer organic molecule layer 100 formed on a surface of the surface layer 120, metal particles 107 bonded to a surface of the spacer organic molecule layer 100, and modifying organic molecules 112 bonded to the metal particles 107 and each containing a quaternary nitrogen cation.

The current collector 101, the surface layer 120, the spacer organic molecules 106, and the metal particles 107 may be the same as those of the above-described second reduction catalyst 4. Also, the modifying organic molecules 112 may be the same as those of the reduction catalyst according to the second aspect of the first reduction catalyst. In short, in Modification Example 2, the modifying organic molecules 112 are organic molecules each having the quaternary nitrogen cation at a portion of a skeleton 110 and an amino group as a terminal functional group 111.

Examples of the modifying organic molecules 112 to be used in Modification Example 2 include molecules same as those of the examples of the modifying organic molecules 112 in the second aspect of the first reduction catalyst.

The modifying organic molecule 112 containing the quaternary nitrogen cation may form a salt with a counter anion as in Modification Example 1. In FIG. 18, a bromide ion is depicted as the counter anion. The amino group may form a salt with hydrofluoric acid, hydrochloric acid, bromic acid, iodic acid, sulfuric acid, nitric acid, or phosphoric acid.

[Reduction Reaction at the Second Reduction Catalyst]

A reduction reaction at the second reduction catalyst will be described by taking $CO_2$ reduction as an example. As described in relation to the first reduction catalyst, the elementary reaction of the ordinary $CO_2$ reduction reaction has the problem of low Faraday efficiency. However, the second reduction catalyst is capable of attaining high reduction efficiency.

In the second reduction catalyst, the reduction reaction occurs at the metal particles 107. With the use of the metal particles 107, it is possible to increase a reaction area (surface area) as compared to a flat plate-like metal layer. As a result, the $CO_2$ reduction reaction efficiency is enhanced.

Also, the quaternary nitrogen cation contained in the modifying organic molecule 112 forms an intermediate with $CO_2$. Therefore, the quaternary nitrogen cation contributes to generation and stabilization of a $CO_2$ radical anion. Accordingly, the second reduction catalyst in which the modifying organic molecules 112 are immobilized on the metal particles 107 is capable of causing the $CO_2$ reduction reaction with lower energy. As a result, it is possible to improve energy conversion efficiency of the reduction catalyst. Also, the quaternary nitrogen cation has the effect of inhibiting water and hydrogen ion from approaching the metal particles 107. Therefore, the quaternary nitrogen cation imparts reaction selectivity to the reduction reaction at the metal particles 107. In short, it is possible to suppress generation of hydrogen caused by the side reaction and to improve the Faraday efficiency.

Further, when the amino group is contained at the terminal of the modifying organic molecule 112, the amino group reacts with a $CO_2$ molecule to form a carbonate. Therefore, it is possible to attract $CO_2$ molecules required for the reduction reaction and supply the $CO_2$ molecules to the quaternary nitrogen cation and metal particles 107. Also, the amino group forms a salt with carboxylic acids, such as formic acid, acetic acid, and oxalic acid, generated by the $CO_2$ reduction. Therefore, the amino group has the effect of promoting a multi-electron reduction reaction in which the reduction occurs continuously. As a result, it is possible to improve the reduction efficiency.

As described above, the second reduction catalyst is capable of attaining the high reduction efficiency. Therefore, with the use of the second reduction catalyst, it is possible to provide a producing system of reduction product capable of recovering the reduction products with high efficiency.

For the second reduction catalyst, a raw material to be reduced selected from the group consisting of oxalic acid, glycolic acid, and glycol aldehyde may be used. The reduction products are varied depending on an interaction among the raw material to be reduced, the quaternary nitrogen cation, and the surface layer 120. For example, when $CO_2$ is used as the raw material, carbon monoxide (CO), formic acid (HCOOH), formaldehyde (HCHO), methanol ($CH_3OH$), acetic acid ($CH_3COOH$), acetaldehyde ($CH_3CHO$), ethanol ($CH_3CH_2OH$), oxalic acid (($COOH)_2$), glycolic acid ($C_2H_2O_3$), glycol aldehyde ($C_2H_2O_2$), and ethylene glycol ($HOCH_2CH_2OH$) can be generated.

Further, as described in Modification Example 2, the second reduction catalyst using the modifying organic molecules 112 each having the amino group as the terminal functional group 111 is capable of generating ethylene glycol with high selectivity. Therefore, with the use of the reduction catalyst of Modification Example 2, it is possible to provide a reduction product producing system that generates ethylene glycol with high selectivity.

[Method of Producing the Second Reduction Catalyst]

Hereinafter, a method of producing the second reduction catalyst will be described.

To start with, the surface layer 120 is formed on the surface of the current collector 101. As a method for the formation, a known vacuum deposition method such as sputtering, vapor deposition, and ALD (atomic layer deposition) may be employed.

Next, the spacer organic molecules 106 are immobilized on the surface layer 120 to form the spacer organic molecule layer 100. As a method for the formation, a method same as that employed in the first reduction catalyst production method for immobilizing the modifying organic molecules 112 on the metal layer 102 may be employed.

It is possible to identify the formation of the spacer organic molecule layer 100 on the surface of the surface layer 120 by a method same as that employed in the method of producing the first reduction catalyst 1 for identifying that the modifying organic molecules 112 are immobilized on the metal layer 102.

Next, the metal particles 107 are prepared. The organic molecules 108 each having a charge are immobilized on the metal particles. Examples of a method for the immobilization include a first method and a second method as described below.

(First Method) When precipitating the metal particles from a liquid layer by reduction in the method of preparing the metal particles, a reducing agent such as citric acid is used. Thus, the citric acid is applied to the surfaces of the metal particles. As a result, the surfaces of the metal particles are negatively charged. Then, the molecules each having an amino group are electrostatically bonded to the surfaces of the negatively charged metal particles.

(Second Method) An amine molecule having a reaction group capable of covalent bonding, such as thiol, is bonded to the surfaces of the metal particles that are not electrically charged. Thus, the metal particles are positively charged. With the method, it is possible to immobilize the electrically charged organic molecules 108 irrespective of the presence or absence of the charge on the surface of each of the metal particles and of whether the charge is positive or negative.

Next, the metal particles 107 on which the electrically charged organic molecules 108 are immobilized are immobilized on the surface of the spacer organic molecule layer 100. Specifically, a dispersion liquid is prepared by dispersing the metal particles 107 in an aqueous solution. The current collector 101 on which the spacer organic molecule layer 100 is formed is immersed into the dispersion liquid. Thus, a second reactive functional group 105 of the spacer organic molecule layer 100 and the organic molecule 108 on each of the surfaces of the metal particles 107 are electrostatically bonded to each other to immobilize the metal particles 107 on the spacer organic molecule layer 100.

The solution in which the metal particles 107 are dispersed is not limited insofar as the metal particles 107 are stably dispersed into the solution. For example, water, ethanol, or toluene may be used. It is preferable to use water or ethanol since they are easy to handle.

Conditions such as a concentration of the dispersion liquid, an immersion time, and an immersion temperature may appropriately be changed since they depend on the synthesis method and stability of the metal particles 107.

When the concentration of the dispersion liquid is too low, it takes time to immobilize the metal particles 107. On the other hand, when the concentration is too high, the metal particles 107 are aggregated in the dispersion liquid to raise a risk that the metal particles 107 are not immobilized on the spacer organic molecule layer 100. Therefore, the concentration of the metal particles in the dispersion liquid may preferably be 0.01 mM or more and 10 mM or less, more preferably 0.1 mM or more and 1 mM or less.

The immersion time may preferably be one hour or more and 50 hours or less, more preferably 5 hours or more and 24 hours or less, in order to immobilize a sufficient amount of the metal particles 107.

The temperature of the dispersion liquid during the immersion may preferably be a room temperature (25° C.) or more and 35° C. or less. When the temperature is too high, dispersion stability of the metal particles 107 is degraded to raise a risk of aggregation of the metal particles 107.

It is possible to identify whether or not the metal particles 107 are immobilized on the surface of the spacer organic molecule layer 100 by employing a known electrochemical method or a surface analysis method.

As the electrochemical method, a cyclic voltammetry may be employed. Hereinafter, a specific example thereof will be described. To start with, a 0.2 M potassium chloride (KCl) aqueous solution in which 1 mM potassium hexacyanoferrate (III) ($K_3[Fe(CN)_6]$) or 1 mM hexaammine ruthenium (III) chloride ($[Ru(NH_3)_6]Cl_3$) is dissolved is prepared. Electrochemical responses of the current collector 101 before and after the step of immobilizing the metal particles 107 are measured to compare the results.

As the electrochemical responses, a reaction current by an electrochemical redox reaction of a hexacyanoferrate (III) anion or a hexaammine ruthenium (III) cation is measured. The reaction current for the current collector 101 on which the metal particles 107 are immobilized is increased as compared to the reaction current for the current collector 101 on which the metal particle 107 are not immobilized. Such phenomenon occurs because the redox reaction of the hexacyanoferrate (III) anion or the hexaammine ruthenium (III) cation is caused due to the immobilization of the metal particles 107 on the spacer organic molecule layer 100. By measuring the above-described reaction current, it is possible to indirectly identify the immobilization of the metal particles 107.

As the surface analysis method, a scanning electron microscope (SEM), a transmission electron microscope (TEM), an atomic force electron microscope (AFM), or a scanning transmission electron microscope (STEM) may be used for direct observation. Also, a composition of the metal may be evaluated by energy dispersive X-ray analysis (EDX) or an electron beam microanalyzer (EPMA), or X-ray photoelectron spectroscopy (XPS).

Further, it is possible to produce the reduction catalyst of Modification Example 1 or Modification Example 2 by immobilizing the modifying organic molecules 112 on the metal particles 107 in the thus-produced reduction catalyst. Specifically, on the metal particles 107 immobilized on the spacer organic molecule layer 100, the modifying organic molecules 112 are immobilized. As a method for the immobilization, a method same as that employed in the method of producing the first reduction catalyst for immobilizing the modifying organic molecules 112 on the metal layer 102 may be employed.

One example of the method for immobilizing the modifying organic molecules 112 on the metal particles 107 will be described in more details.

To start with, a solution in which the modifying organic molecules 112 are dissolved is prepared. Next, the current collector 101 on which the metal particles 107 are formed is immersed into the prepared solution. An immersion time is from a several minutes to a several hours. Thus, the modifying organic molecules 112 are immobilized on the surfaces of the metal particles 107. Conditions such as a concentration of modifying organic molecules 112, an immersion time, and an immersion temperature may appropriately be changed depending on the structure and the like of the modifying organic molecules 112.

It takes time to immobilize a sufficient amount of the modifying organic molecules 112 when a concentration of the prepared solution is too low. On the other hand, when the concentration is too high, an excessive amount of the modifying organic molecules 112 are absorbed to raise a risk of layering of the molecules. Therefore, the concentration of the modifying organic molecules 112 may preferably be 0.1 mM or more and 100 mM or less, more preferably 1 mM or more and 10 mM or less.

The immersion time may preferably be sufficient for forming a dense monolayer having aligned orientations. The immersion time may preferably be one minute or more and 100 hours or less, and 12 hours or more and 72 hours or less.

The temperature of the prepared solution during the immersion influences on the formation of the dense monolayer having aligned orientation. Therefore, the temperature may desirably be a room temperature (25° C.) or more to 60° C. or less in view of a vapor pressure and a boiling point of a solvent.

The solvent of the prepared solution is not particularly limited insofar as the solvent is capable of dissolving the modifying organic molecules. For example, an alcohol such as ethanol and an aromatic or aliphatic organic solvent such as toluene and hexane may be used. It is preferable to use ethanol since the modifying organic molecules 112 have high solubility into ethanol, and since ethanol is easy to handle.

By the above-described method, it is possible to produce the reduction catalyst of Modification Example 1 or Modification Example 2. In the thus-obtained reduction catalyst, it is possible to further stack the metal particles 107 on the modifying organic molecules 112. One example of further stacking the modifying organic molecules 112 and the metal particles 107 will be described in more details below.

The quaternary nitrogen cation contained in each of the modifying organic molecules 112 has a positive charge. Therefore, by bringing the modifying organic molecules 112 into contact with an aqueous solution in which an anion containing the metal element forming the metal particles 107 is dissolved, the quaternary nitrogen cation and the anion containing the metal element are electrostatically bonded to each other by an anion exchange reaction. Subsequently, by performing electrochemical reduction or reduction using hydrogen gas in the aqueous solution, the metal nanoparticle is carried on the surface of the quaternary nitrogen cation. The metal nanoparticles correspond to the metal particles 107.

As the metal element capable of causing precipitation in the vicinity of the quaternary nitrogen cation, Au or Pt may be used. As a raw material of the anion containing Au or Pt, salts of sodium tetrachloroaurate (III) dihydrate (Na[AuCl$_4$] 2H$_2$O), potassium chloroaurate (III) (K[AuCl$_4$]), potassium tetrachloroplatinate (II) (K$_2$[PtCl$_4$]), and potassium hexachloroplatinate (IV) (K$_2$[PtCl$_6$]) are usable.

This method will be described specifically below. The anion exchange is performed by immersing the current collector 101 having the metal particles 107 immobilized thereon and having the modifying organic molecules 112 immobilized on the metal particles 107 into a solution in which the anion containing Au or Pt is dissolved. Thus, the anion containing Au or Pt is electrostatically bonded to the quaternary nitrogen cations contained in the modifying organic molecules 112. A concentration of the salt of the anion containing Au or Pt in the solution in which the anion is dissolved may preferably be 0.1 mM or more and 100 mM or less. An anion exchange time may preferably be 30 minutes or more and 2 hours or less.

Next, the current collector 101 after the anion exchange is immersed into an alkaline aqueous solution to allow reduction by controlled potential reduction electrolysis. As the alkaline aqueous solution, a sodium hydrogencarbonate solution having a concentration of 0.5 M may be used. A three-electrode cell using the current collector 101 as a working electrode, an Ag—AgCl electrode as a reference electrode, and a Pt electrode as a counter electrode is used for the electrolysis, and the electrolysis is performed under the conditions that a potential of −0.5 V is applied onto the working electrode for about one hour.

Alternatively, the current collector 101 after the anion exchange is immersed into an aqueous solution in to which a H$_2$ gas is dissolved. The immersion may be conducted for about one hour. Thus, it is possible to form the metal particles 107 on the surface of the quaternary nitrogen cations.

Next, the modifying organic molecules 112 containing the quaternary nitrogen cations are further immobilized on the surfaces of the Au or Pt nanoparticles precipitated in the vicinity of the quaternary nitrogen cations. By repeating the step of precipitating the metal particle 107 near the quaternary nitrogen cations and the step of immobilizing the modifying organic molecules 112 described above, it is possible to increase an amount of the metal particles 107.

According to the embodiment described above, it is possible to provide a system capable of recovering the reduction products of carbon dioxide with high efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A producing system of a reduction product of carbon dioxide, comprising:
    a chemical reaction apparatus comprising an oxidation reaction electrolytic bath provided with an oxidation catalyst and a reduction reaction electrolytic bath provided with a reduction catalyst, the chemical reaction apparatus configured to generate a reduction product by reducing carbon dioxide;
    an electrolytic solution supply unit supplying an electrolytic solution to the reduction reaction electrolytic bath;
    a carbon dioxide supply unit configured to dissolve carbon dioxide into the electrolytic solution, the carbon dioxide supply unit serving to sustain a reduction reaction in the reduction reaction electrolytic bath such that a concentration of the reduction product in the electrolytic solution is increased; and
    a separation unit configured to separate the reduction product from the electrolytic solution in which the concentration of the reduction product is increased,
    wherein the separation unit comprises an extractor configured to extract the reduction product and the carbon dioxide from the electrolytic solution having increased concentration of the reduction product into an ionic liquid as an extraction solvent, a carbon dioxide separation column configured to separate the carbon dioxide from the ionic liquid containing the reduction product and the carbon dioxide extracted by the extractor, and a rectifying column configured to separate the reduction product from the ionic liquid from which the carbon dioxide has been separated by the carbon dioxide separation column.

2. The system according to claim 1, wherein the electrolytic solution supply unit comprises a storage tank storing the electrolytic solution, a first pipe serving to supply the electrolytic solution from the storage tank to the reduction reaction electrolytic bath, and a second pipe serving to discharge the electrolytic solution from the reduction reaction electrolytic bath and return the electrolytic solution to the storage tank, and wherein at least one of the storage tank, the first pipe, and the second pipe is provided with the carbon dioxide supply unit.

3. The system according to claim 1, wherein the extraction solvent comprises, as the ionic liquid, at least one type of compound comprising an organic cation selected from an alkyl ammonium cation, a pyridinium cation, a piperidinium cation, a pyrrolidinium cation, an imidazolium cation, and an alkyl phosphonium cation.

4. The system according to claim 1, wherein the rectifying column comprises a first rectifying column configured to separate methanol, a second rectifying column configured to separate ethanol, and a third rectifying column configured to separate ethylene glycol, from the ionic liquid from which the carbon dioxide has been separated.

5. The system according to claim 1, further comprising a pipe serving to feed the ionic liquid from which the reduction product has been separated by the rectifying column from the rectifying column to the extractor.

6. The system according to claim 1, further comprising: a preparation tank serving to prepare an electrolytic solution to which the carbon dioxide is dissolved using the electrolytic solution, from which the reduction product and the carbon dioxide have been separated by the extractor, and the carbon dioxide separated by the carbon dioxide separation column; and a pipe serving to feed the electrolytic solution prepared in the preparation tank from the preparation tank to the electrolytic solution supply unit.

7. The system according to claim 1, wherein the chemical reaction apparatus further comprises a power source element connected to an oxidation catalyst layer comprising the oxidation catalyst and a reduction catalyst layer comprising the reduction catalyst.

8. The system according to claim 1,
wherein the reduction catalyst comprises:
a current collector having a metal layer on a surface thereof; and
a modifying organic molecule containing a quaternary nitrogen cation, the modifying organic molecule bonded to a surface of the metal layer.

9. The system according to claim 8, wherein the modifying organic molecule comprises at least one type of quaternary nitrogen anion selected from an alkyl ammonium cation, a pyridinium cation, a piperidinium cation, and an imidazolium cation.

10. The system according to claim 1,
wherein the reduction catalyst comprises:
a current collector having a surface layer,
a spacer organic molecule layer formed on the surface layer, and
metal particles bonded to a surface of the spacer organic molecule layer.

11. The system according to claim 10, further comprising a modifying organic molecule containing a quaternary nitrogen cation, the modifying organic molecule bonded to a surface of the metal particles.

12. The system according to claim 11, wherein the modifying organic molecule comprises at least one type of quaternary nitrogen anion selected from an alkyl ammonium cation, a pyridinium cation, a piperidinium cation, and an imidazolium cation.

* * * * *